(12) United States Patent
Kato

(10) Patent No.: US 12,276,259 B2
(45) Date of Patent: Apr. 15, 2025

(54) ROTARY BLADE, ROTATING DEVICE, AND POWER GENERATION DEVICE

(71) Applicant: Eco Technology Co., Ltd., Nagoya (JP)

(72) Inventor: Masaharu Kato, Nagoya (JP)

(73) Assignee: Eco Technology Co., Ltd. (JP)

( * ) Notice: Subject to any disclaimer, the term of this patent is extended or adjusted under 35 U.S.C. 154(b) by 0 days.

(21) Appl. No.: 18/271,005

(22) PCT Filed: Oct. 22, 2021

(86) PCT No.: PCT/JP2021/039050
§ 371 (c)(1),
(2) Date: Jul. 5, 2023

(87) PCT Pub. No.: WO2022/163043
PCT Pub. Date: Aug. 4, 2022

(65) Prior Publication Data
US 2024/0301862 A1 Sep. 12, 2024

(30) Foreign Application Priority Data

Jan. 29, 2021 (JP) .................................. 2021-012949
Jun. 22, 2021 (JP) .................................. 2021-102908

(51) Int. Cl.
*F03D 3/06* (2006.01)
*F03D 9/25* (2016.01)

(52) U.S. Cl.
CPC ............... *F03D 3/061* (2013.01); *F03D 9/25* (2016.05)

(58) Field of Classification Search
CPC ............ F05B 2240/306; F05B 2240/32; F05D 2240/306; F03D 3/061
See application file for complete search history.

(56) References Cited

U.S. PATENT DOCUMENTS

2009/0167027 A1 7/2009 Kato

FOREIGN PATENT DOCUMENTS

| DE | 4122919 A1 | * | 1/1993 | ............ F03D 3/061 |
| GB | 2032048 A | * | 4/1980 | ............ B64C 3/14 |
| JP | 2003299207 A | | 10/2003 | |
| JP | 3905121 B1 | | 4/2007 | |
| JP | 2008082251 A | | 4/2008 | |
| JP | 2008190518 A | | 8/2008 | |
| WO | 2014175613 A1 | | 10/2014 | |
| WO | 2014181585 A1 | | 11/2014 | |

* cited by examiner

*Primary Examiner* — Brian O Peters
(74) *Attorney, Agent, or Firm* — Polsinelli PC

(57) ABSTRACT

A wind power generation device includes rotary blades that each includes a front blade surface parallel to the rotation axis and curved to protrude frontward, and a rear blade surface, being parallel to the rotation axis, curved so as to be concave frontward, and having a smaller curve depth than the front blade surface. The front blade surface includes a first curved surface far from the rotation axis and formed frontward from an outer end, and a second curved surface close to the rotation axis and formed rearward from a crest to connect to an inner end, a surface length thereof being smaller than that of the first curved surface. The first curved surface has recesses at positions closer to the outer end than to the crest of the front blade surface. Thus, the rotary blade rotates by receiving a fluid and can improve rotation efficiency.

9 Claims, 16 Drawing Sheets

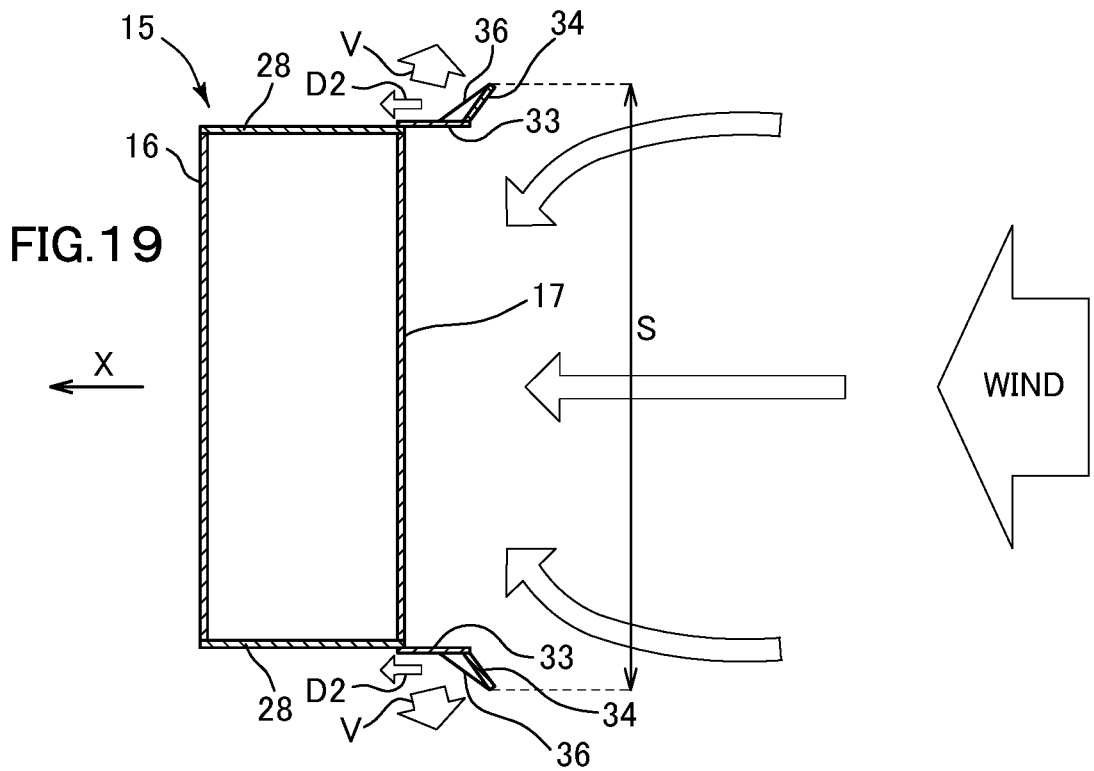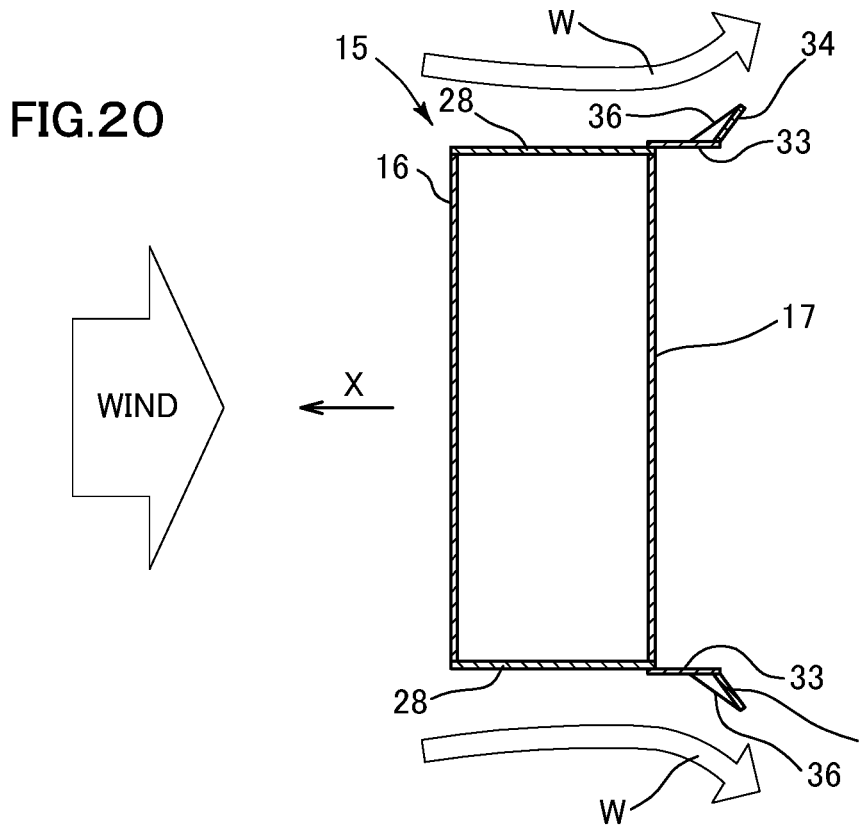

ROTARY BLADE, ROTATING DEVICE, AND POWER GENERATION DEVICE

CROSS-REFERENCE TO RELATED APPLICATIONS

The present application is a U.S. National Stage application of the Patent Cooperation Treaty (PCT) application PCT/JP2021/039050, filed Oct. 22, 2021, which claims priority to (1) Japanese Patent Application No. 2021-012949, filed Jan. 29, 2021 and (2) Japanese Non-Provisional Application No. 2021-102908, filed Jun. 22, 2021.

FIELD OF THE INVENTION

This disclosure relates to a rotary blade that rotates by receiving a fluid such as air flow or water flow.

BACKGROUND OF THE INVENTION

Patent Documents 1 to 3 disclose rotating devices (wind turbine, wind power generator) including a plurality of rotary blades (blades, wind turbine blades) which rotate about a rotation axis by receiving wind power (air flow). Each rotary blade disclosed in Patent Documents 1 to 3 has a front blade surface (front side surface, front convex surface) parallel to the rotation axis and curved so as to protrude frontward in a rotation direction, and a rear blade surface (rear side surface, rear concave surface) which is located on the back side of the front blade surface and which extends in parallel to the rotation axis and is curved so as to be concave frontward in the rotation direction, the rear blade surface having a smaller curve depth than the front blade surface. The front blade surface includes a first curved surface (air-flow high-speed pass surface, first surface, first convex surface) forming a part far from the rotation axis, and a second curved surface (air-flow low-speed pass surface, second surface, second convex surface) forming a part close to the rotation axis and having a smaller surface length than the first curved surface in a plan view. According to Patent Documents 1 to 3, the rotary blade can be rotated by drag generated when wind is received by the rear blade surface and lift generated by a speed difference between air flows flowing along the first and second curved surfaces of the front blade surface.

CITATION LIST

Patent Document

Patent Document 1: Japanese Patent No. 3905121
Patent Document 2: Japanese Laid-Open Patent Publication No. 2008-82251
Patent Document 3: WO2014/181585

SUMMARY OF INVENTION

Problems to be Solved by the Invention

However, the rotary blade and the rotating device including a plurality of the rotary blades in Patent Documents 1 to 3 have problems in rotation-efficiency improvement as follows, for example.
  A part of a fluid from the front flows along the front blade surface, and then goes around to an area facing the rear blade surface, thereby generating rotation resistance on the following rotary blade.
  In the rotary blade, maximum drag (i.e., maximum rotation torque) is generated when a fluid is received by the rear blade surface. In the rotating device having a plurality of rotary blades arranged around the rotation axis, maximum drag on each rotary blade is alternately generated through rotation of the plurality of rotary blades, and variation in drag (i.e., rotation torque) with respect to the rotational position is great.

This disclosure has been made in view of the above circumstances, and an object of this disclosure is to provide a rotary blade including the front blade surface (first curved surface and second curved surface) and the rear blade surface, or a rotating device including a plurality of the rotary blades, the rotary blade or the rotating device enabling improvement in rotation efficiency.

Solution to the Problems

To achieve the above-described object, a first rotary blade of this disclosure is provided rotatably about a rotation axis and configured to receive a fluid, and includes: a front blade surface parallel to the rotation axis and curved so as to protrude frontward in a rotation direction; and a rear blade surface located on a back side of the front blade surface, the rear blade surface being parallel to the rotation axis and curved so as to be concave frontward in the rotation direction, the rear blade surface having a smaller curve depth than the front blade surface. In a plan view perpendicular to the rotation axis, an end of the front blade surface on a side far from the rotation axis is defined as an outer end, and an end thereof on a side close to the rotation axis is defined as an inner end. The front blade surface includes a first curved surface forming a part far from the rotation axis and formed frontward in the rotation direction from the outer end, and a second curved surface forming a part close to the rotation axis and formed rearward in the rotation direction from a side opposite to the outer end of the first curved surface, so as to connect to the inner end, a surface length of the second curved surface in the plan view being smaller than that of the first curved surface. A recess is formed on the first curved surface. A part of the first curved surface where the recess is not formed is defined as a main surface. The recess includes a first inner surface forming a stepped portion facing rearward in the rotation direction, and a second inner surface formed rearward in the rotation direction from an end in a recessed direction of the first inner surface and connecting to the outer end or the main surface. A plane obtained by extending a plane having the same curvature as a curvature of the main surface at a boundary portion between the main surface and the first inner surface toward the recess side from the boundary portion is defined as a virtual curved plane. As seen in a cross-section perpendicular to the rotation axis, a slope angle of the first inner surface is defined as an angle between an extended line obtained by extending a tangent of the main surface at the boundary portion between the main surface and the first inner surface outward from the boundary portion, and a tangent of the first inner surface at the boundary portion, or an angle between a tangent of the virtual curved plane at a boundary portion between the virtual curved plane and the first inner surface, and a tangent of the first inner surface at the boundary portion. As seen in the cross-section perpendicular to the rotation axis, a slope angle of the second inner surface is defined as an angle between an extended line obtained by extending a tangent of the second inner surface at a boundary portion between the second inner surface and the main surface outward from the boundary portion, and a tangent of the main surface of the boundary portion, or an angle between a tangent of the virtual curved plane at a boundary portion between the virtual curved plane and the second inner surface, and a tangent of the second inner surface at the boundary portion. The slope angle of the second inner surface is smaller than the slope angle of the first inner surface.

Accordingly, drag for rotating the rotary blade can be generated when a fluid is received by the rear blade surface. Lift can be generated by a flow-speed difference between a fluid flowing rearward along the first curved surface of the front blade surface and a fluid flowing rearward along the second curved surface thereof. The rotary blade can be efficiently rotated by the drag and the lift. The recess formed on the first curved surface can serve as a vortex generator. That is, local fluid stagnation (vortex) is generated at the recess, and owing to the stagnation, a fluid from the front can be prevented from going around to an area opposed to the rear blade surface, and rotation resistance can be prevented from being generated on the following rotary blade. A fluid from the rear is received by the recess, whereby drag for moving the rotary blade frontward can be generated at the recess, in addition to the rear blade surface. Thus, rotation efficiency of the rotary blade can be improved.

A second rotary blade of this disclosure is provided rotatably about a rotation axis and configured to receive a fluid, and includes: a front blade surface parallel to the rotation axis and curved so as to protrude frontward in a rotation direction; a rear blade surface located on a back side of the front blade surface, the rear blade surface being parallel to the rotation axis and curved so as to be concave frontward in the rotation direction, the rear blade surface having a smaller curve depth than the front blade surface; and a blade-support portion supporting ends, in a direction parallel to the rotation axis, of the front blade surface and the rear blade surface. In a plan view perpendicular to the rotation axis, an end of the front blade surface on a side far from the rotation axis is defined as an outer end, and an end thereof on a side close to the rotation axis is defined as an inner end. The front blade surface includes a first curved surface forming a part far from the rotation axis and formed frontward in the rotation direction from the outer end, and a second curved surface forming a part close to the rotation axis and formed rearward in the rotation direction from a side opposite to the outer end of the first curved surface, so as to connect to the inner end, a surface length of the second curved surface in the plan view being smaller than that of the first curved surface. A recess is formed on the first curved surface. The blade-support portion includes a body portion supporting the front blade surface and the rear blade surface, and having a rear end which extends in a rotation radial direction and is located at a position overlapping the rear blade surface or a position rearward in the rotation direction relative to the rear blade surface, as seen in the plan view, and a slope portion formed along the rear end and extending from the rear end toward an oblique direction having a direction component toward a side opposite to a side where the rear blade surface is located in the direction parallel to the rotation axis and a direction component rearward in the rotation direction.

Accordingly, a fluid from the rear can be received by the slope portion provided to the blade-support portion. Thus, drag for moving the rotary blade frontward can be generated at the slope portion, in addition to the rear blade surface. As seen in the plan view, the slope portion is located at a position overlapping the rear blade surface or a position rearward in the rotation direction relative to the rear blade surface, and extends toward the oblique direction having the direction component toward the side opposite to the side where the rear blade surface is located in the direction parallel to the rotation axis, and the direction component rearward in the rotation direction. Thus, a fluid hitting the slope portion from the rear can be guided to the rear blade surface. Since the slope portion extends toward the oblique direction, the slope portion can be prevented from serving as resistance against a fluid from the front. Since the slope portion is formed to rise from the body portion of the blade-support portion, rigidity of the blade-support portion can be improved, and the rotary blade can be prevented from being displaced in a direction other than the rotation direction. Thus, rotation efficiency of the rotary blade can be improved.

A rotating device according to this disclosure includes a plurality of stage portions in each of which a plurality of rotary blades provided rotatably about a rotation axis and configured to receive a fluid are arranged at equal intervals around the rotation axis, the stage portions being arranged in a direction of the rotation axis. Each of the rotary blades includes a front blade surface parallel to the rotation axis and curved so as to protrude frontward in a rotation direction, and a rear blade surface located on a back side of the front blade surface, the rear blade surface being parallel to the rotation axis and curved so as to be concave frontward in the rotation direction, the rear blade surface having a smaller curve depth than the front blade surface. In a plan view perpendicular to the rotation axis, an end of the front blade surface on a side far from the rotation axis is defined as an outer end, and an end thereof on a side close to the rotation axis is defined as an inner end. The front blade surface includes a first curved surface forming a part far from the rotation axis and formed frontward in the rotation direction from the outer end, and a second curved surface forming a part close to the rotation axis and formed rearward in the rotation direction from a side opposite to the outer end of the first curved surface, so as to connect to the inner end, a surface length of the second curved surface in the plan view being smaller than that of the first curved surface. A recess is formed on the first curved surface. The stage portions include the rotary blades whose numbers are the same among the plurality of stage portions. Rotation directions of the rotary blades are the same among the plurality of stage portions. The plurality of stage portions have an angle difference from each other in arrangement positions of the rotary blades in a direction around the rotation axis. The plurality of stage portions are connected so as to rotate while keeping the angle difference.

Accordingly, since a plurality of stage portions are provided so as to have the same rotation direction and have an angle difference in the direction around the rotation axis, even when any stage portion is at a rotational position where drag is hardly generated, drag dropping can be prevented owing to another stage portion having an angle difference in the rotation direction. Thus, variation in drag (rotation torque) with respect to the rotation position can be reduced, whereby rotation efficiency of the rotating device can be improved.

BRIEF DESCRIPTION OF THE DRAWINGS

FIG. 19 is a sectional view of the rotary blade along a plane parallel to the rotation axis and shows a state in which wind from the rear in the rotation direction acts on the rotary blade.

FIG. 20 is a sectional view of the rotary blade along a plane parallel to the rotation axis and shows a state in which wind from the front in the rotation direction acts on the rotary blade.

DESCRIPTION OF EMBODIMENTS

Figure 1:
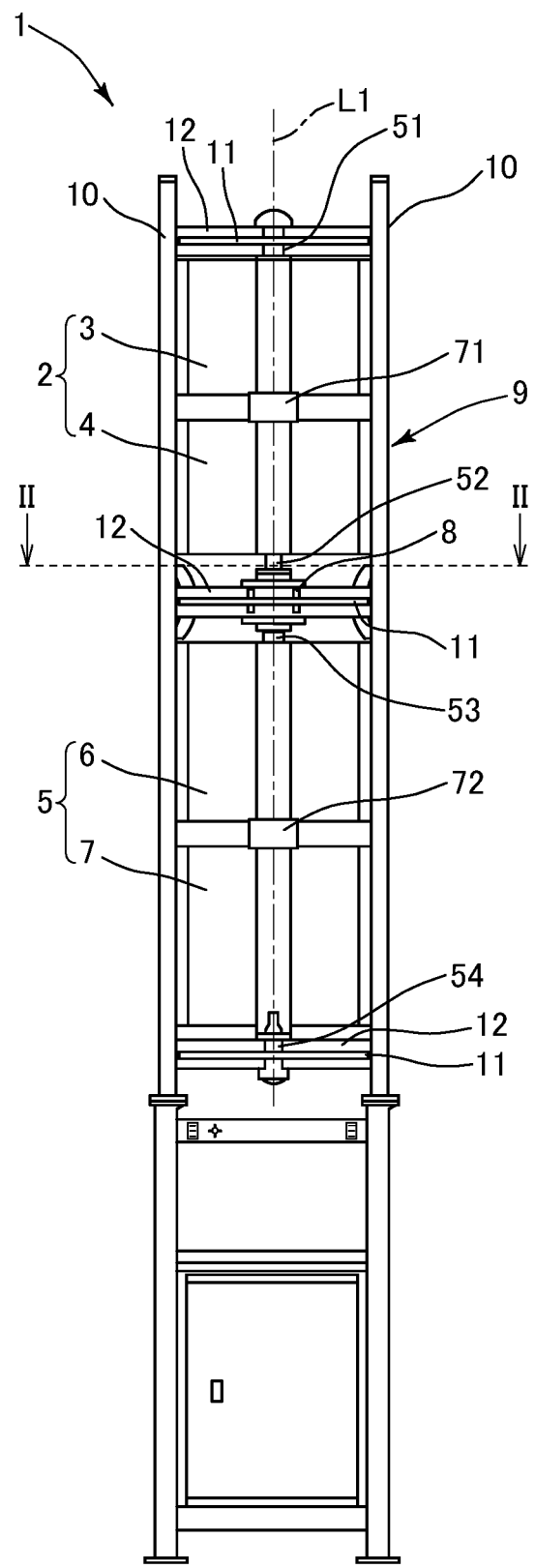
FIG. 1 is a side view of a wind power generation device.

Hereinafter, an embodiment of this disclosure will be described with reference to the drawings. A wind power generation device 1 as a power generation device shown in FIG. 1 is a vertical-axis wind power generation device including a plurality of rotary blades which rotate rotation axis L1 extending in the vertical about a direction. The wind power generation device 1 is provided such that the rotation axis L1 is perpendicular to the flow direction of wind (air flow). The wind power generation device 1 includes a support frame 9, a first wind turbine 2, a second wind turbine 5, and a power generator 8. The first and second wind turbines 2 and 5 correspond to rotating devices, the first wind turbine 2 corresponds to a first rotating device, and the second wind turbine 5 corresponds to a second rotating device. The power generator 8 corresponds to a power generation portion.

Figure 2:
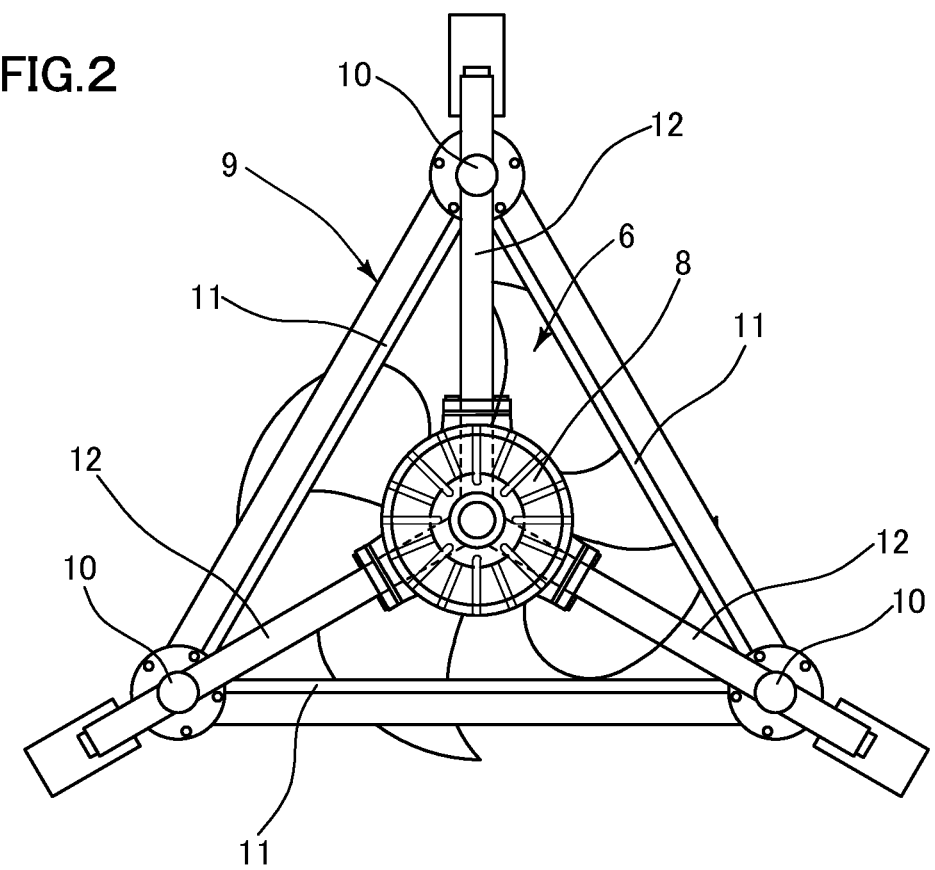
FIG. 2 is a plan view of the wind power generation device at a position of line II-II in FIG. 1.

The support frame 9 includes three columns 10 extending in the vertical direction, and a plurality of beam members 11 connecting the columns 10 (see also FIG. 2). The three columns 10 are located at vertex positions of an equilateral triangle in a plan view (see FIG. 2) perpendicular to the vertical direction (up-down direction). The beam members 11 connect the columns 10 at a plurality of height positions including the upper end of the columns 10. Three beam members 11 at each height position form an equilateral-triangle shape (see FIG. 2). In FIG. 2, the rotary blades of an upper-stage portion 6 of the second wind turbine 5 (described later) are shown, but the rotary blades of a lower-stage portion 7 (see FIG. 1) are not shown. (described later) formed on the first curved surface of each rotary blade are not shown.

The support frame 9 includes a plurality of connection members 12 extending from the respective columns 10 in the horizontal direction toward the center where the rotation axis L1 is present, at a plurality of height positions in the up-down direction. As shown in FIG. 1, the connection members 12 are provided at a height position where a first rotary shaft 51 of the wind power generation device 1 is located, a height position where a fourth rotary shaft 54 is located, and a height position where the power generator 8 is located. Ends of the connection members 12 on a side opposite to the side connected to the columns 10 are connected to a shaft-support portion supporting the first rotary shaft 51, a shaft-support portion supporting the fourth rotary shaft 54, or the power generator 8.

The first and second wind turbines 2 and 5 are so-called vertical-type wind turbines, and have the shared rotation axis L1 extending in the vertical direction, as shown in FIG. 1. The rotation axis L1 is a virtual axis, and actual rotary shafts 51, 52, 53, 54 are provided on the upper and lower sides of the wind turbines 2, 5 without penetrating the wind turbines 2, 5. The rotation axis L1 and the rotary shafts 51, 52, 53, 54 are located at the centroid of the equilateral triangle when the support frame 9 is seen in the up-down direction.

The first wind turbine 2 is located at a stage above the second wind turbine 5. The first wind turbine 2 is configured to rotate in a constant direction from whichever lateral wind direction is received. Specifically, the first wind turbine 2 is divided into two upper and lower stages and includes an upper-stage portion 3 and a lower-stage portion 4.

Figure 3:
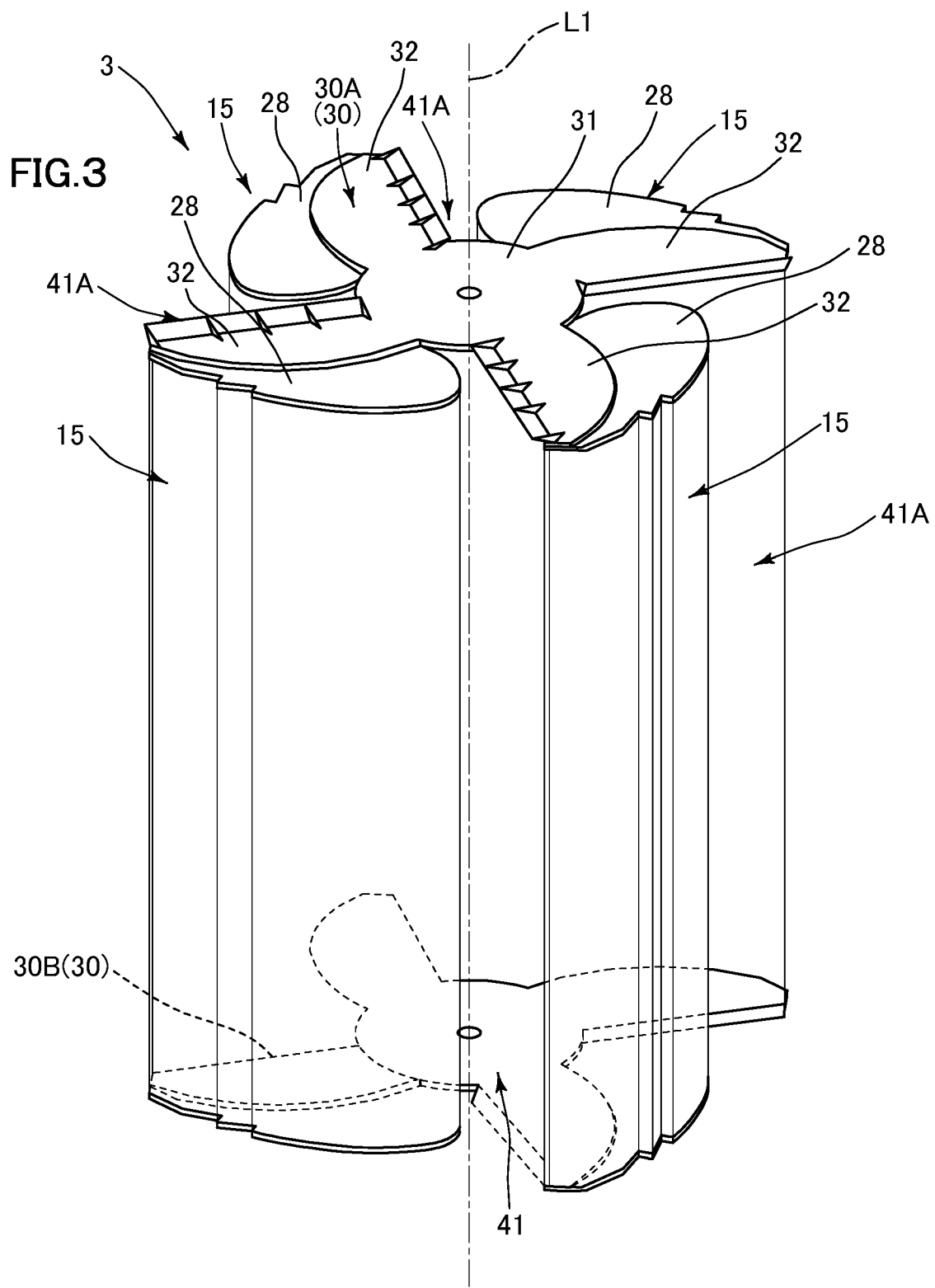
FIG. 3 is a perspective view of an upper-stage portion of a first wind turbine.
Figure 4:
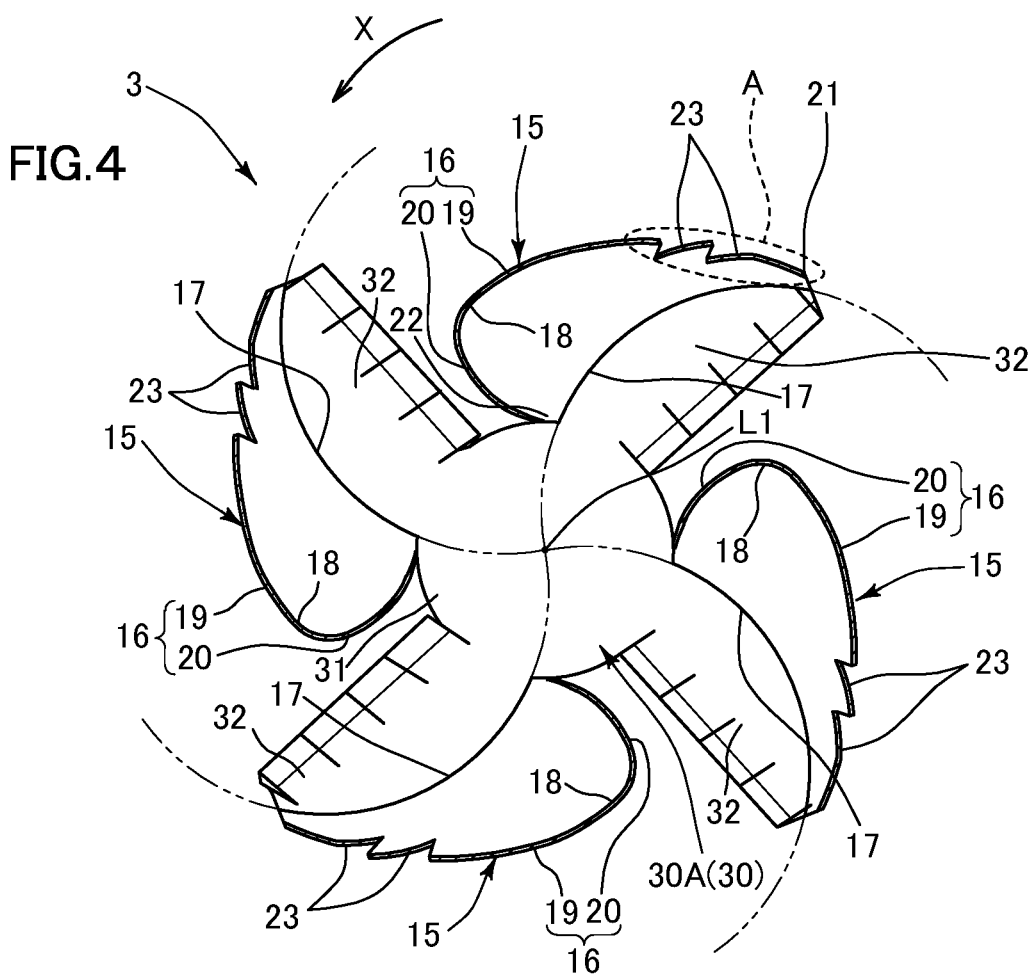
FIG. 4 is a top view of the upper-stage portion of the first wind turbine.

As shown in FIGS. 3 and 4, the upper-stage portion 3 includes four rotary blades 15. In FIG. 4, lid plates 28 (described later) are not shown. The four rotary blades 15 have the same shape and are different only in attachment positions. The four rotary blades 15 are located at equal intervals (i.e., 90-degree rotation-angle intervals) in the circumferential direction about the rotation axis L1 and at positions to which radial-direction distances from the rotation axis L1 are the same. Examples of the material of the rotary blade 15 include light alloys such as aluminum, duralumin, and titanium, and synthetic resins such as glassfiber-reinforced plastics (GFRP), carbon-fiber-reinforced plastics (CFRP), and polycarbonate (PC).

Figure 5:
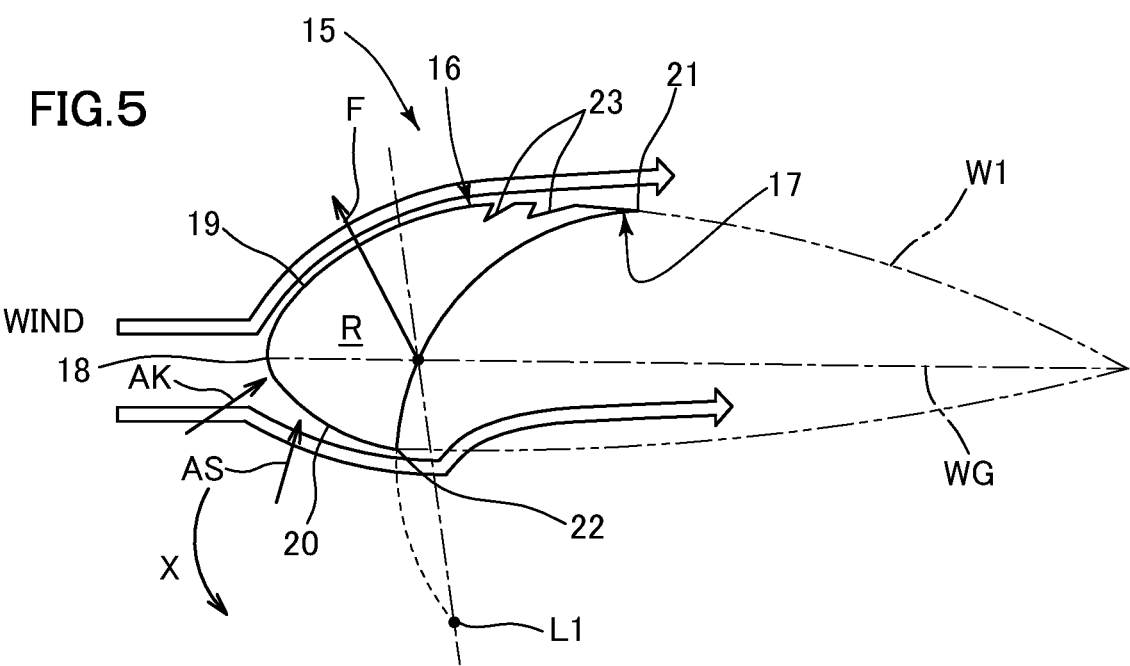
FIG. 5 is a plan view of a rotary blade receiving wind from the front in a rotation direction.

The rotary blade 15 is a member that receives an air flow (wind force) by a surface facing in a direction (horizontal direction) perpendicular to the rotation axis L1 (i.e., a surface parallel to the rotation axis L1) and generates a rotational force by the received air flow. As seen in the vertical direction, the rotary blade 15 has a shape using a front part of an assumed wing shape WI as shown in FIG. 5. The wing shape WI is a shape similar to a cross-section of a general airplane wing and capable of generating lift against wind (WIND) from the front, and is a shape in which one side (later-described first curved surface 19 side) with respect to a wing chord WG bulges more largely than another side (later-described second curved surface 20 side). Here, AK denotes the direction of relative wind due to rotation, and AS denotes the direction of natural wind. The rotary blade 15 is subjected to lift F, thus rotating in an X direction around the rotation axis L1.

A cross-section of the rotary blade 15 as seen in the vertical direction has the same shape at any of horizontal sectional positions. As seen in the vertical direction, the rotary blade 15 includes a front-side plate 16 on the front side in the advancing direction (rotation direction) X and a rear-side plate 17 on the rear side in the advancing direction X. A part between the plates 16, 17 is a space, i.e., is hollow.

A front blade surface which is an outer surface of the front-side plate 16 is formed as a convex curved surface parallel to the rotation axis L1 and curved so as to protrude frontward in the rotation direction X. The front blade surface 16 is formed in a shape having a greater curve depth than the rear-side plate 17 (rear blade surface). Specifically, the front blade surface 16 has a crest 18 where the curvature is maximum, at an intermediate position in the rotation radial direction of the rotary blade 15, and includes a first curved surface 19 located on a side farther than the crest 18 from the rotation center (rotation axis L1) and facing outward in the rotation radial direction, and a second curved surface 20 located on a rotation center side relative to the crest 18 and facing in the rotation direction X. The crest 18 is a part (boundary portion) located at the boundary between the first curved surface 19 and the second curved surface 20.

The first curved surface 19 is located on the side far from the rotation axis L1 and is formed continuously from the crest 18 rearward in the rotation direction X. That is, the first curved surface 19 is formed continuously frontward in the rotation direction X from an outer end 21 which is an end on a side opposite to the crest 18. The first curved surface 19 is formed in an arc shape having a constant curvature except for a part near the crest 18, for example. As seen in the vertical direction, assuming the wing chord WG of the wing shape WI as shown in FIG. 5, the first curved surface 19 has a curved-surface shape bulging in a direction away from the wing chord WG more largely than the second curved surface 20. In plan views in FIGS. 4 and 5, the first curved surface 19 has a greater surface length than the second curved surface 20, i.e., extends rearward in the rotation direction X more than the second curved surface 20. The outer end 21 which is a rotation-direction rear end of the first curved surface 19 (the end on the side opposite to the crest 18) is located at a position farthest from the rotation axis L1 in the rotary blade 15, and is located rearward in the rotation direction X relative to an inner end 22 which is a rear end of the second curved surface 20. The first curved surface 19 serves as a high-speed air-flow pass surface so that the speed of a relative air flow generated along the first curved surface 19 from the crest 18 toward the outer end 21 becomes greater than the speed of a relative air flow generated along the second curved surface 20 from the crest 18 toward the inner end 22.

Recesses 23 are formed on a part of the first curved surface 19. In this embodiment, two recesses 23 are formed per rotary blade 15. The recesses 23 are formed at positions closer to the outer end 21 than to the crest 18. That is, as seen in plan views in FIGS. 4 and 5, when the area of the first curved surface 19 is divided into two areas on both sides of an intermediate position of the first curved surface 19, the recesses 23 are formed in the area on the outer end 21 side and are not formed in the area on the crest 18 side. The second curved surface 20 and the rear blade surface 17 have no recesses 23.

Figure 6:
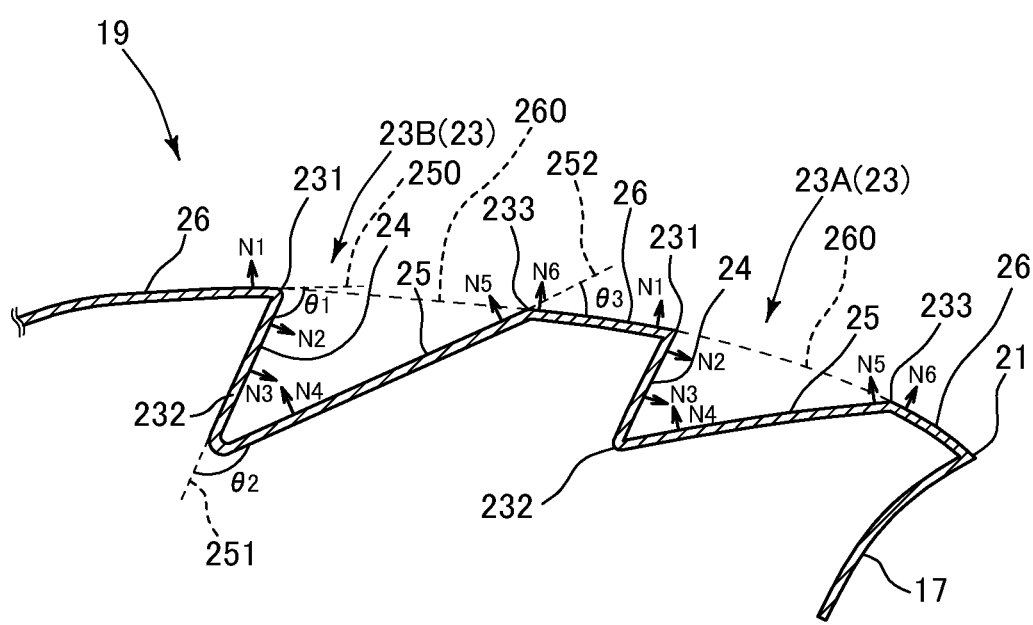
FIG. 6 is an enlarged plan view of recesses formed on a first curved surface, at part A in FIG. 4.

Hereinafter, a part of the first curved surface 19 where the recesses 23 are not formed is referred to as a main surface. Each recess 23 has a wedge shape as seen in a cross-section perpendicular to the rotation axis L1. Specifically, as seen in the cross-section perpendicular to the rotation axis L1, as shown in FIG. 6, the recess 23 includes, of the first curved surface 19, a first inner surface 24 forming a stepped portion facing rearward in the rotation direction X and a second inner surface 25 formed rearward in the rotation direction X from an end 232 in the recessed direction of the first inner surface 24 and connecting to the outer end 21 or the main surface 26. The first inner surface 24 forms, of inner surfaces of the recess 23, an inner surface located frontward in the rotation direction X. A slope angle θ1 (see FIG. 6) of the first inner surface 24 with respect to the main surface 26 is, for example, not smaller than 60 degrees and not greater than 150 degrees, and preferably not smaller than 90 degrees and not greater than 150 degrees. The slope angle θ1 is an angle between a first tangent extended line 250 obtained by extending a tangent of the main surface 26 at a boundary portion 231 between the main surface 26 and the first inner surface 24 outward (toward the recess 23 side) from the boundary portion 231, and a tangent of the first inner surface 24 at the boundary portion 231. That is, the slope angle θ1 is an angle between a normal N1 of the main surface 26 at the boundary portion 231 and a normal N2 of the first inner surface 24 at the boundary portion 231. In a case where the boundary portion 231 has a rounded shape, the slope angle θ1 is defined on the basis of a tangent or a normal N1 of the main surface 26 and a tangent or a normal N2 of the first inner surface 24 at a point where the rounded shape starts or ends. As shown in a cross-section in FIG. 6, the first inner surface 24 extends in a straight shape or a curve shape having a constant curvature toward the second inner surface 25 from the boundary portion 231 between the first inner surface 24 and the main surface 26.

A slope angle θ2 (see FIG. 6) of the second inner surface 25 with respect to the first inner surface 24 is, for example, not smaller than 90 degrees and not greater than 150 degrees. The slope angle θ2 is an angle between a second tangent extended line 251 obtained by extending a tangent of the first inner surface 24 at a boundary portion 232 between the first inner surface 24 and the second inner surface 25 outward from the boundary portion 232, and a tangent of the second inner surface 25 at the boundary portion 232. That is, the slope angle θ2 is an angle between a normal N3 of the first inner surface 24 at the boundary portion 232 and a normal N4 of the second inner surface 25 at the boundary portion 232. In a case where the boundary portion 232 has a rounded shape, the slope angle θ2 is defined on the basis of a tangent or a normal N3 of the first inner surface 24 and a tangent or a normal N4 of the second inner surface 25 at a point where the rounded shape starts or ends.

Here, a plane 260 (see FIG. 6) obtained by extending a plane having the same curvature as the curvature of the main surface 26 at the boundary portion 231 between the main surface 26 and the first inner surface 24 toward the recess 23 side from the boundary portion 231, is defined as a virtual curved plane. The second inner surface 25 is formed at a position recessed from the virtual curved plane 260. As seen in the cross-section in FIG. 6, the second inner surface 25 extends in a straight shape or a curve shape having a constant curvature toward the virtual curved plane 260 from the boundary portion 232 between the second inner surface 25 and the first inner surface 24.

A slope angle θ3 (see FIG. 6) of the second inner surface 25 with respect to the main surface 26 is smaller than the slope angles θ1, θ2, and specifically, not smaller than 10 degrees but smaller than 90 degrees, for example. The slope angle θ3 is an angle between a third tangent extended line 252 obtained by extending a tangent of the second inner surface 25 at a boundary portion 233 between the second inner surface 25 and the main surface 26 outward from the boundary portion 233, and a tangent of the main surface 26 at the boundary portion 233. That is, the slope angle θ3 is an angle between a normal N5 of the second inner surface 25 at the boundary portion 233 and a normal N6 of the main surface 26 at the boundary portion 233. In a case where the boundary portion 233 has a rounded shape, the slope angle θ3 is defined on the basis of a tangent or a normal N5 of the second inner surface 25 and a tangent or a normal N6 of the main surface 26 at a point where the rounded shape starts or ends. The surface length of the second inner surface 25 in the cross-section in FIG. 6, for example, is greater than that of the first inner surface 24. Thus, it becomes easy to satisfy the condition that the slope angle θ3 is smaller than the slope angle θ1.

The slope angle θ1 has the same meaning as a slope angle of the first inner surface 24 with respect to the virtual curved plane 260, that is, means an angle between a tangent or a normal of the virtual curved plane 260 at the boundary portion 231 between the virtual curved plane 260 and the first inner surface 24, and a tangent or a normal of the first inner surface 24 at the boundary portion 231. The slope angle θ3 has the same angle as a slope angle of the second inner surface 25 with respect to the virtual curved plane 260, that is, means an angle between a tangent or a normal of the virtual curved plane 260 at the boundary portion 233 between the virtual curved plane 260 and the second inner surface 25, and a tangent or a normal of the second inner surface 25 at the boundary portion 233.

Figure 23:
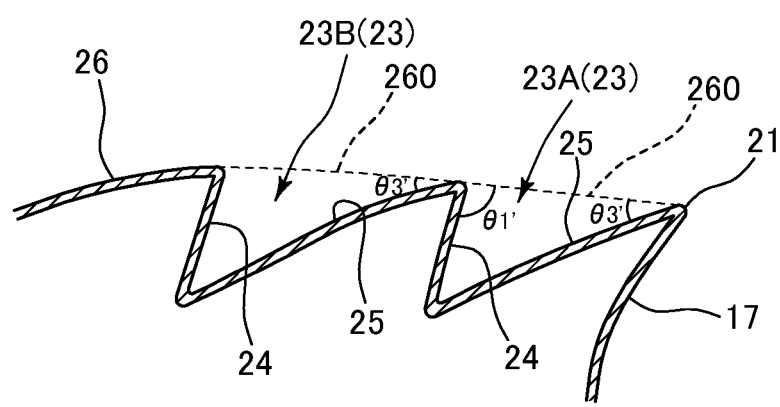
FIG. 23 shows modification of a part around recesses on the first curved surface.

In a case where the main surface 26 is not present at the boundary portions 231, 233, specifically, as shown in FIG. 23, in a case where a first recess 23A and a second recess 23B are adjacent to each other with the main surface 26 not interposed therebetween or a case where the first recess 23A connects to the outer end 21 with the main surface 26 not interposed therebetween, the virtual curved plane 260 may be set and a slope angle θ1' of the first inner surface 24 or a slope angle θ3' of the second inner surface 25 with respect to the virtual curved plane 260 may be defined. In this case, the slope angle θ1' is set at a value similar to the slope angle θ1. The slope angle θ3' is set at a value smaller than the slope angle θ1' and similar to the slope angle θ3.

In the example in FIG. 6, the main surface 26 or a maximum-curvature point 233 is interposed between the outer end 21 and the second inner surface 25 of the recess 23A closest to the outer end 21. Here, the straight distance between the rear end 233 (maximum-curvature point 233) of the recess 23A and the outer end 21 may be smaller than the straight distance between the front end 231 and the rear end 233 of the recess 23A, for example. Thus, the recesses 23A, 23B are formed at positions closer to the outer end 21, so that the recesses 23A, 23B more readily serve as vortex generators (described later). As shown in FIG. 23, the second inner surface 25 of the recess 23A and the outer end 21 may be connected directly (with the main surface 26 or the curvature maximum point 233 not interposed therebetween). This case means that an end of the second inner surface 25 on the side opposite to the side connected to the first inner surface 24 becomes the outer end 21. Also, this case means that, on the first curved surface 19, a cutout 23A as a recess is formed continuously to the outer end 21. In the example in FIG. 6, the main surface 26 is interposed between the first recess 23A and the second recess 23B. However, as shown in FIG. 23, the main surface 26 may not be interposed. That is, the end of the second inner surface 25 of the second recess 23B and the end of the first inner surface 24 of the first recess 23A may be connected directly (with the main surface 26 not interposed therebetween).

The recess 23 is formed to penetrate (i.e., extend continuously) from one end to another end, in the direction parallel to the rotation axis L1, of the front blade surface 16. A cross-section of the recess 23 perpendicular to the rotation axis L1 has the same shape (shape shown in FIG. 6) at any position on the rotation axis L1.

The two recesses 23A, 23B may have the same shape or different shapes. Specifically, the length of the first inner surface 24, the length of the second inner surface 25, or each slope angle θ1 to θ3 may be the same or different between the recesses 23A, 23B.

The second curved surface 20 is located on the side close to the rotation axis L1 and is formed continuously from the crest 18 rearward in the rotation direction X. The second curved surface 20 is formed in an arc shape having a constant curvature except for a part near the crest 18, for example. The inner end 22 which is an end of the second curved surface 20 on the side opposite to the crest 18 is located at a position closest to the rotation axis L1 in the rotary blade 15. The second curved surface 20 is opposed to the rear blade surface 17 of the rotary blade 15 located at a frontward adjacent position in the rotation direction X (see FIG. 4). The surface length of the second curved surface 20 in plan views in FIGS. 4 and 5 is smaller than that of the first curved surface 19.

The rear-side plate 17 is located on the back side of the front-side plate 16 (front blade surface), connects the outer end 21 and the inner end 22 of the front-side plate 16, and is curved so as to be concave frontward in the rotation direction X. That is, the rear blade surface which is an outer surface of the rear-side plate 17 is formed as a concave-curved surface parallel to the rotation axis L1 and curved so as to be concave frontward in the rotation direction X. The rear blade surface 17 forms a part of a cylindrical plane including the rotation axis L1 on the plane. That is, as seen in plan views in FIGS. 4 and 5, the rotation axis L1 is located at a position on an arc line extended from the arc of the shape of the rear blade surface 17 toward the rotation axis L1 side. Thus, the rotary blade 15 can cause wind (air flow) hitting the rear blade surface 17 to flow toward a later-described wind tunnel 41 (see FIG. 3) and cause the wind to hit the rotary blade 15 on the opposite side across the wind tunnel 41. The rear blade surface 17 has a smaller curve depth than the front blade surface 16. Therefore, a hollow space R (see FIG. 5) is formed between the front blade surface 16 and the rear blade surface 17.

As shown in FIG. 3, the rotary blade 15 includes the lid plate 28 in addition to the front-side plate 16 and the rear-side plate 17. Two lid plates 28 are provided to each rotary blade 15. The two lid plates 28 have the same shape and have plate shapes similar to the shape of the hollow space R in a plan view shown in FIG. 5. One of the two lid plates 28 is fixed to upper ends of the front-side plate 16 and the rear-side plate 17, i.e., ends thereof on one side in the direction parallel to the rotation axis L1, thus closing the space R (see FIG. 5). The other lid plate 28 is fixed to lower ends of the front-side plate 16 and the rear-side plate 17, i.e., ends thereof on the other side in the direction parallel to the rotation axis L1, thus closing the space R (see FIG. 5).

The rotary blade 15 includes a pair of blade-support portions 30 (30A, 30B) opposed to each other in the up-down direction. The front-side plate 16, the rear-side plate 17, and the lid plates 28 are supported by the blade-support portions 30. That is, the ends (upper ends and lower ends), in the direction parallel to the rotation axis L1, of the front blade surface 16 and the rear blade surface 17 are indirectly connected (supported) to the blade-support portions 30 via the lid plates 28. The blade-support portions 30 support the four rotary blades 15. Examples of the material of the blade-support portion 30 include light alloys such as aluminum, duralumin, and titanium, and synthetic resins such as glass-fiber-reinforced plastics (GFRP), carbon-fiber-reinforced plastics (CFRP), and polycarbonate (PC).

The upper blade-support portion 30A has a plate shape and is provided such that the normal of a central portion 31 (described later) is directed in the direction parallel to the rotation axis L1. As shown in FIGS. 3 and 4, the blade-support portion 30A includes the round-shaped central portion 31 provided at the position of the rotation axis L1, and four arm portions 32 radially extending outward in the radial direction from the outer periphery of the central portion 31. The center of the central portion 31 is located on the rotation axis L1. The first rotary shaft 51 (see FIG. 1) is fixed at the center of the central portion 31.

The four arm portions 32 have the same shape and are arranged at equal intervals in the circumferential direction around the center (i.e., rotation axis L1) of the central portion 31. Each arm portion 32 includes an arm body 33 (see FIG. 7) extending outward in the radial direction from the outer periphery of the central portion 31. The arm body 33 has, on the front side in the rotation direction X (advancing direction), a front end 33a having a shape (arc shape) curved toward a direction opposite to the rotation direction X as becoming away from the central portion 31, and has a straight-shaped rear end 33b on the rear side in the rotation direction X. The curvature of the front end 33a is equivalent to the curvature of the rear blade surface 17. The front end 33a and the rear end 33b are formed to extend from the outer side to the inner side in the rotation radial direction. The front end 33a and the rear end of the lid plate 28 overlap each other and these are fixed by a screw or the like, whereby each rotary blade 15 (front blade surface 16, rear blade surface 17, and lid plate 28) is connected to the corresponding arm body 33. The rear end 33b is located rearward in the rotation direction X relative to the rear blade surface 17 of the connection-target rotary blade 15 to which the arm body 33 is connected, and is located frontward in the rotation direction X relative to the front blade surface 16 of the following rotary blade 15 located at an adjacent position rearward of the connection-target rotary blade 15. The central portion 31 and the arm body 33 correspond to a body portion.

Figure 7:
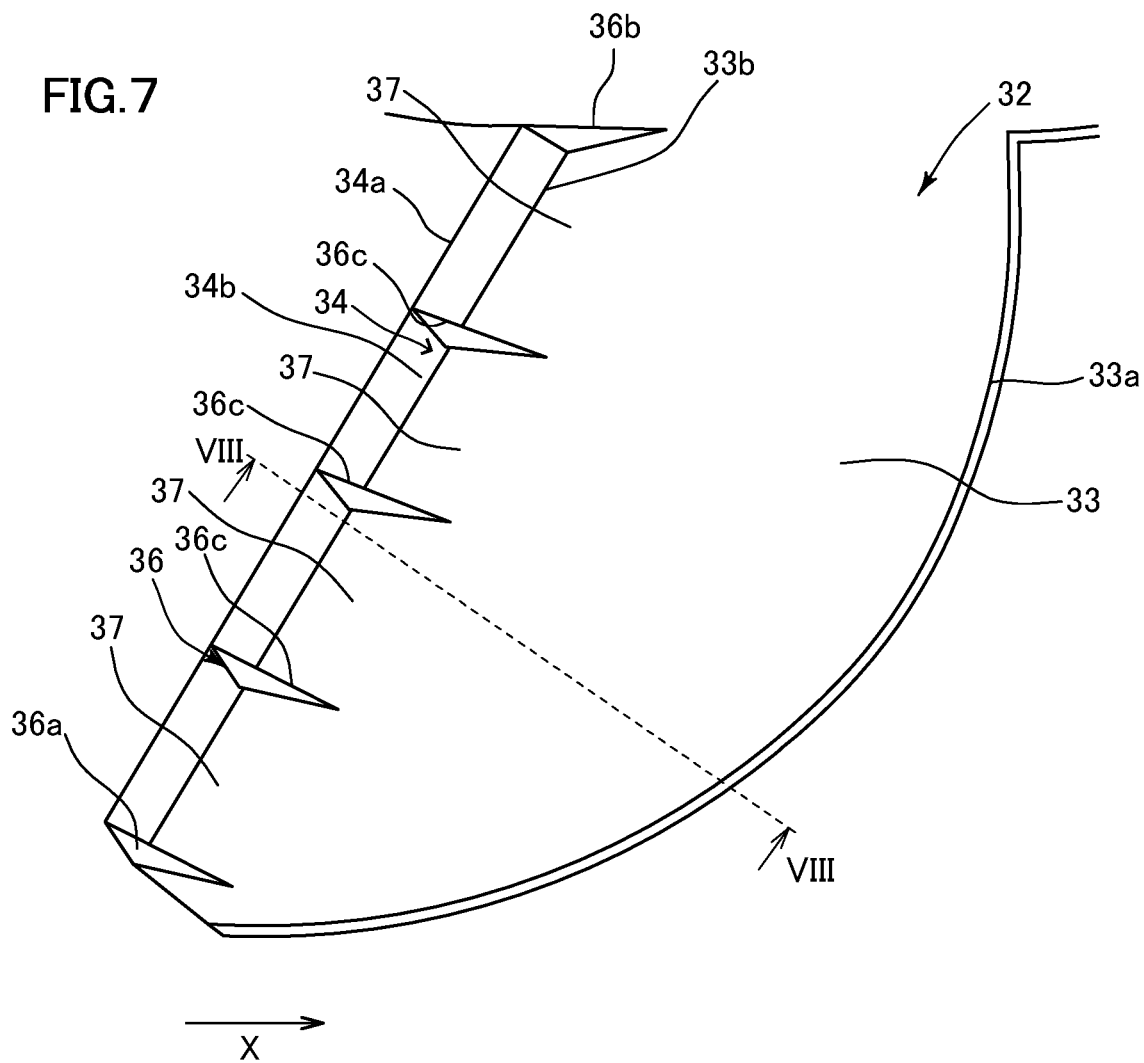
FIG. 7 is an enlarged perspective view of an arm portion of a blade-support portion.
Figure 8:
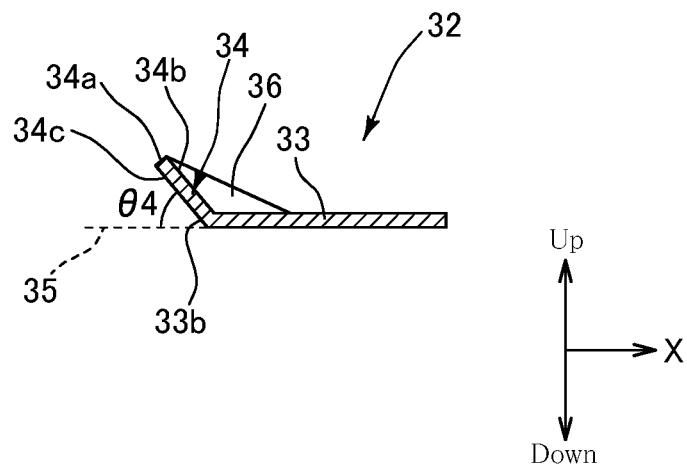
FIG. 8 is a sectional view of the blade-support portion along line VIII-VIII in FIG. 7.

As shown in FIGS. 7 and 8, the arm portion 32 includes, in addition to the arm body 33, a slope portion 34 rising in an oblique direction from the rear end 33b of the arm body 33. The slope portion 34 is connected to the arm body 33 by welding or the like. The slope portion 34 may be formed by bending a plate material forming the arm body 33. The slope portion 34 has a plate shape extending in a straight shape along the rear end 33b. In this embodiment, the entire slope portion 34 is located rearward in the rotation direction X relative to the rear blade surface 17 of the connection-target rotary blade 15 and located frontward in the rotation direction X relative to the front blade surface 16 of the following rotary blade 15.

The oblique direction is a direction having a direction component toward a side opposite to the side where the rotary blade 15 (i.e., rear blade surface 17) is located in the direction parallel to the rotation axis L1 (i.e., an upward-direction component for the upper blade-support portion 30A, a downward-direction component for the lower blade-support portion 30B), and a direction component rearward in the rotation direction X. Thus, where an end of the slope portion 34 on the side connected to the arm body 33 is defined as a base end (corresponding to the rear end 33b of the arm body 33) and an end 34a on the opposite side is defined as a distal end, the slope portion 34 of the upper blade-support portion 30A extends upward and rearward in the rotation direction X as approaching toward the distal end 34a from the base end. One surface 34b (see FIG. 8) of the slope portion 34 of the upper blade-support portion 30A faces an area upward and frontward in the rotation direction X. Another surface 34c (see FIG. 8) of the slope portion 34 faces an area downward and rearward in the rotation direction X, i.e., an area opposed to the rear blade surface 17 of the connection-target rotary blade 15.

As shown in FIG. 8, a slope angle θ4 of the slope portion 34 with respect to the arm body 33 is smaller than 90 degrees, for example, and more specifically, not smaller than 15 degrees and not greater than 45 degrees, for example. The slope angle θ4 is an angle between the slope portion 34 and a virtual plane 35 obtained by extending the surface of the arm body 33 outward from the rear end 33b.

As shown in FIGS. 7 and 8, the arm portion 32 includes a plurality of plate-shaped erected portions 36 as ribs, in addition to the arm body 33 and the slope portion 34. The plurality of erected portions 36 are arranged with intervals therebetween along the rear end 33b of the arm body 33. Each erected portion 36 is formed to be erected from both of an outer surface of the arm body 33 (a surface on a side opposite to the side where the later-described wind tunnel 41 is formed, a surface on a side opposite to a surface facing an area opposed to the rear blade surface 17) (an upper surface for the upper blade-support portion 30A, a lower surface for the lower blade-support portion 30B), and the surface 34b of the slope portion 34 that faces frontward in the rotation direction X. The erected portion 36 has a triangular-plate shape, is connected to the arm body 33 over the entirety of one side of the triangle by welding or the like, is connected to the slope portion 34 over the entirety of another side by welding or the like, and is not connected on the remaining one side. One end of the one side of the erected portion 36 that is connected to the slope portion 34 is located at the base end 33b of the slope portion 34, and another end is located at the distal end 34a of the slope portion 34. One end of the one side of the erected portion 36 that is connected to the arm body 33 is located at the rear end 33b of the arm body 33, and another end is located away from the front end 33a of the arm body 33.

As shown in FIG. 7, the plurality of erected portions 36 include, for example, two erected portions 36a, 36b located at both ends of the rear end 33b of the arm body 33, and a plurality of (three in the example in FIG. 7) erected portions 36c located between the erected portions 36a, 36b. The space frontward of the slope portion 34 is divided into a plurality of spaces 37 by the plurality of erected portions 36.

Each erected portion 36 may be connected at an angle other than a right angle with respect to one or both of the arm body 33 and the slope portion 34, or may be formed in non-parallel to the adjacent erected portion 36.

The lower blade-support portion 30B is formed in a symmetric shape with the upper blade-support portion 30A with respect to a plane perpendicular to the rotation axis L1. That is, the blade-support portion 30B is different from the upper blade-support portion 30A in that the slope portion 34 and the erected portions 36 are provided on the lower side of the arm body 33, and the other configurations are the same as those of the upper blade-support portion 30A. A center part of the lower blade-support portion 30B is fixed to a first spacer 71 (see FIG. 1) by a screw or the like.

As shown in FIG. 3, at a part surrounded by the upper and lower blade-support portions 30A, 30B and the four rotary blades 15, the wind tunnel 41 is formed as a hollow portion centered at the rotation axis L1 and having air-flow inlet/outlet portions 41A between the adjacent rotary blades 15. A substantial rotary shaft is not provided in the wind tunnel 41.

Figure 9:
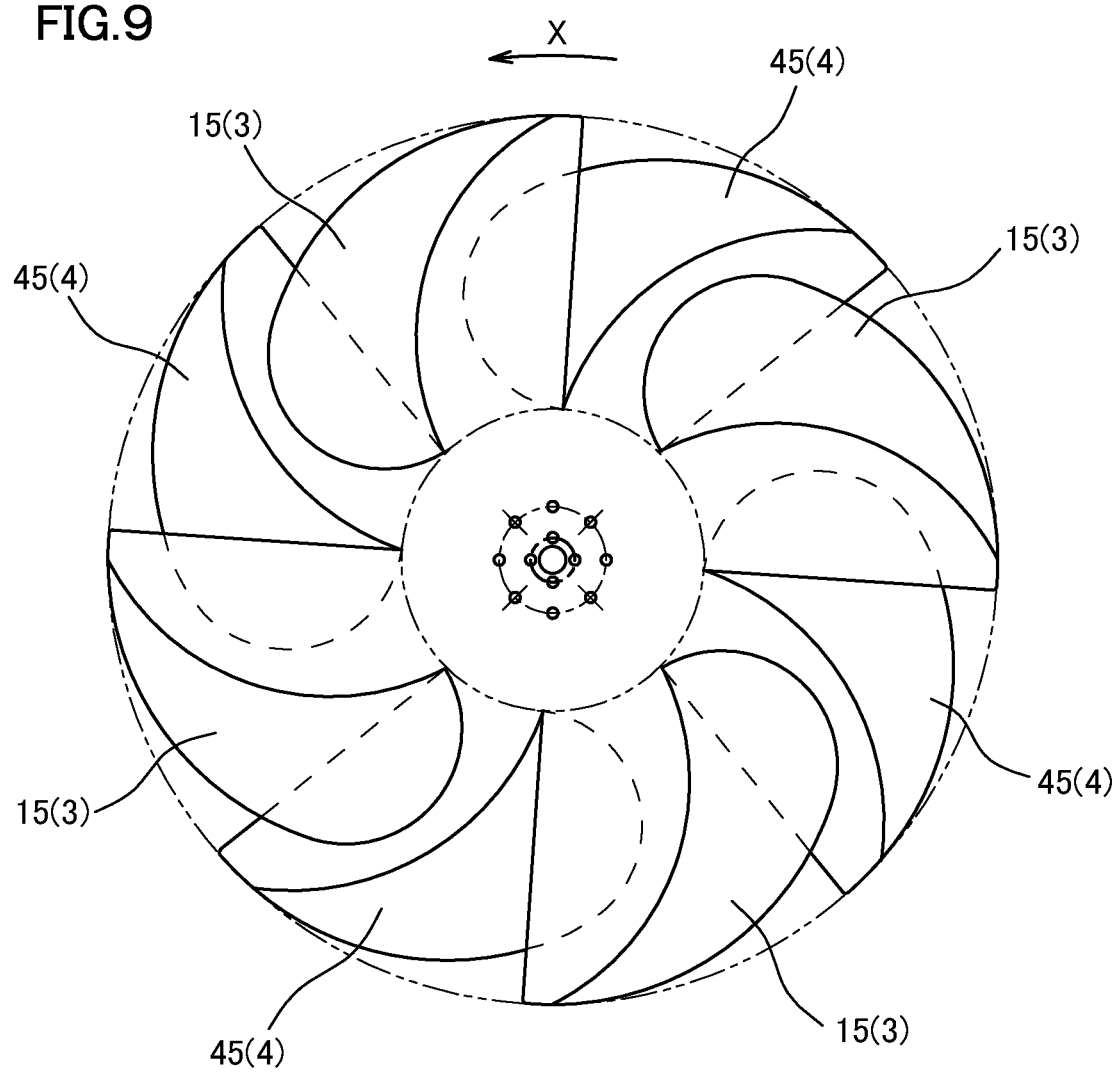
FIG. 9 is a plan view showing the positional relationship in the rotation direction between rotary blades of the upper-stage portion and rotary blades of a lower-stage portion of the first wind turbine.

The lower-stage portion 4 (see FIG. 1) of the first wind turbine 2 is provided below the upper-stage portion 3, and has the rotation axis L1 shared with the upper-stage portion 3. The lower-stage portion 4 is located at a position shifted by a predetermined angle relative to the upper-stage portion 3 in the direction around the rotation axis L1, and the other configurations are the same as those of the upper-stage portion 3. Specifically, as shown in FIG. 9, the lower-stage portion 4 includes rotary blades 45 whose number is the same (i.e., four) as the number of the rotary blades 15 of the upper-stage portion 3. The shapes of the rotary blades 45 are identical to each other and are the same as those of the rotary blades 15 of the upper-stage portion 3. The rotary blades 45 are arranged at equal intervals in the direction around the rotation axis L1. The rotary blades 45 are provided so as to rotate in the same direction X as the rotary blades 15 of the upper-stage portion 3, that is, front blade surfaces (convex curved surfaces) of the rotary blades 45 face in the direction X, and rear blade surfaces (concave-curved surfaces) face in the direction opposite to the direction X. The predetermined angle is half of the angle (specifically, 90 degrees) representing the arrangement interval of the rotary blades 15 of the upper-stage portion 3 in the direction around the rotation axis L1, i.e., is 45 degrees. Therefore, as seen in a plan view in FIG. 9, each rotary blade 45 of the lower-stage portion 4 is provided at an intermediate position between the adjacent rotary blades 15 of the upper-stage portion 3. In this embodiment, the length of the lower-stage portion 4 (rotary blade 45) in the direction parallel to the rotation axis L1 is the same as the length of the upper-stage portion 3 (rotary blade 15), but may be different from the length of the upper-stage portion 3. In FIG. 9, the recesses formed at the first curved surfaces, and the slope portions and the erected portions formed at the blade-support portion, are not shown.

A center part of the upper blade-support portion of the lower-stage portion 4 is fixed to the first spacer 71 (see FIG. 1) by a screw or the like. The second rotary shaft 52 (see FIG. 1) is fixed to a center part of the lower blade-support portion of the lower-stage portion 4.

The upper-stage and lower-stage portions 3 and 4 are arranged with an interval therebetween in the direction of the rotation axis L1 via the first spacer 71, and are connected to each other so as to integrally rotate in the same rotation direction and at the same rotation speed. Thus, the rotary blades 15 of the upper-stage portion 3 rotate in the rotation direction X while keeping a rotation-angle difference by 45 degrees from the rotary blades 45 of the lower-stage portion 4.

The first spacer 71 is provided such that the axis thereof coincides with the rotation axis L1, so as to be rotatable around the axis. The length of the first spacer 71 in the axial direction is set to such a length that the slope portions (parts corresponding to the slope portion 34 of the blade-support portion 30A in FIGS. 7 and 8) of the lower blade-support portion 30B of the upper-stage portion 3 and the slope portions (parts corresponding to the slope portion 34 in FIGS. 7 and 8) of the upper blade-support portion of the lower-stage portion 4 do not contact with each other.

The first rotary shaft 51 and the second rotary shaft 52 connected on the upper and lower sides of the first wind turbine 2 are members defining the rotation axis L1, and are supported rotatably around the axis L1 by shaft-support portions. Thus, the first wind turbine 2 is provided rotatably around the axis L1.

The second wind turbine 5 has the same configuration as the first wind turbine 2 except that the entire shape of the second wind turbine 5 is a shape obtained by reversing the first wind turbine 2 as a mirror image with respect to a plane perpendicular to the rotation axis L1 and that the second wind turbine 5 is longer than the first wind turbine 2 in the direction of the rotation axis L1. That is, the second wind turbine 5 is located below the first wind turbine 2 with the power generator 8 therebetween. The second wind turbine 5 has the rotation axis L1 shared with the first wind turbine 2, but is provided so as to rotate in a direction opposite to the rotation direction of the first wind turbine 2. The second wind turbine 5 is divided into two upper and lower stages and includes the upper-stage and lower-stage portions 6 and 7.

The upper-stage portion 6 includes rotary blades (including a pair of upper and lower blade-support portions) whose number is the same (i.e., four) as the number of the rotary blades 15, 45 of the upper-stage portion 3 or the lower-stage portion 4 of the first wind turbine 2. The front blade surface, the rear blade surface, and the lid plate of each rotary blade of the upper-stage portion 6 have the same shapes as those of the rotary blades 15, 45 of the first wind turbine 2 except that the rotation direction is opposite. The blade-support portions of the upper-stage portion 6 have the same shapes as the blade-support portions 30A, 30B of the first wind turbine 2 except that the rotation direction is opposite. A center part of the upper blade-support portion of the upper-stage portion 6 is fixed to the third rotary shaft 53 (see FIG. 1). A center part of the lower blade-support portion of the upper-stage portion 6 is fixed to a second spacer 72 (see FIG. 1).

The lower-stage portion 7 includes rotary blades whose number is the same (i.e., four) as the rotary blades of the upper-stage portion 6. The rotary blades of the lower-stage portion 7 are provided so as to rotate in the same direction as the rotary blades of the upper-stage portion 6 and are located at positions shifted by 45 degrees in the rotation direction relative to the rotary blades of the upper-stage portion 6. A center part of the upper blade-support portion of the lower-stage portion 7 is fixed to the second spacer 72. A center part of the lower blade-support portion of the lower-stage portion 7 is fixed to the fourth rotary shaft 54 (see FIG. 1). In this embodiment, the length of the lower-stage portion 7 in the direction parallel to the rotation axis L1 is the same as the length of the upper-stage portion 6, but may be different from the length of the upper-stage portion 6.

The upper-stage and lower-stage portions 6 and 7 are arranged with an interval therebetween in the direction of the rotation axis L1 via the second spacer 72, and are connected to each other so as to integrally rotate in the same rotation direction and at the same rotation speed. Thus, the rotary blades of the upper-stage portion 6 and the rotary blades of the lower-stage portion 7 rotate while keeping a rotation-angle difference by 45 degrees from each other.

The second spacer 72 is provided such that the axis thereof coincides with the rotation axis L1, so as to be rotatable around the axis. The length of the second spacer 72 in the axial direction is set to such a length that the slope portions (parts corresponding to the slope portion 34 in FIGS. 7 and 8) of the lower blade-support portion of the upper-stage portion 6, and the slope portions (parts corresponding to the slope portion 34 in FIGS. 7 and 8) of the upper blade-support portion of the lower-stage portion 7 do not contact with each other.

The third rotary shaft 53 and the fourth rotary shaft 54 connected on the upper and lower sides of the second wind turbine 5 are members defining the rotation axis L1, and are supported rotatably around the axis L1 by shaft-support portions. Thus, the second wind turbine 5 is provided rotatably around the axis L1.

In this embodiment, the length of the second wind turbine 5 in the direction parallel to the axis L1 is greater than the length of the first wind turbine 2, but may be the same as the length of the first wind turbine 2.

Figure 10:
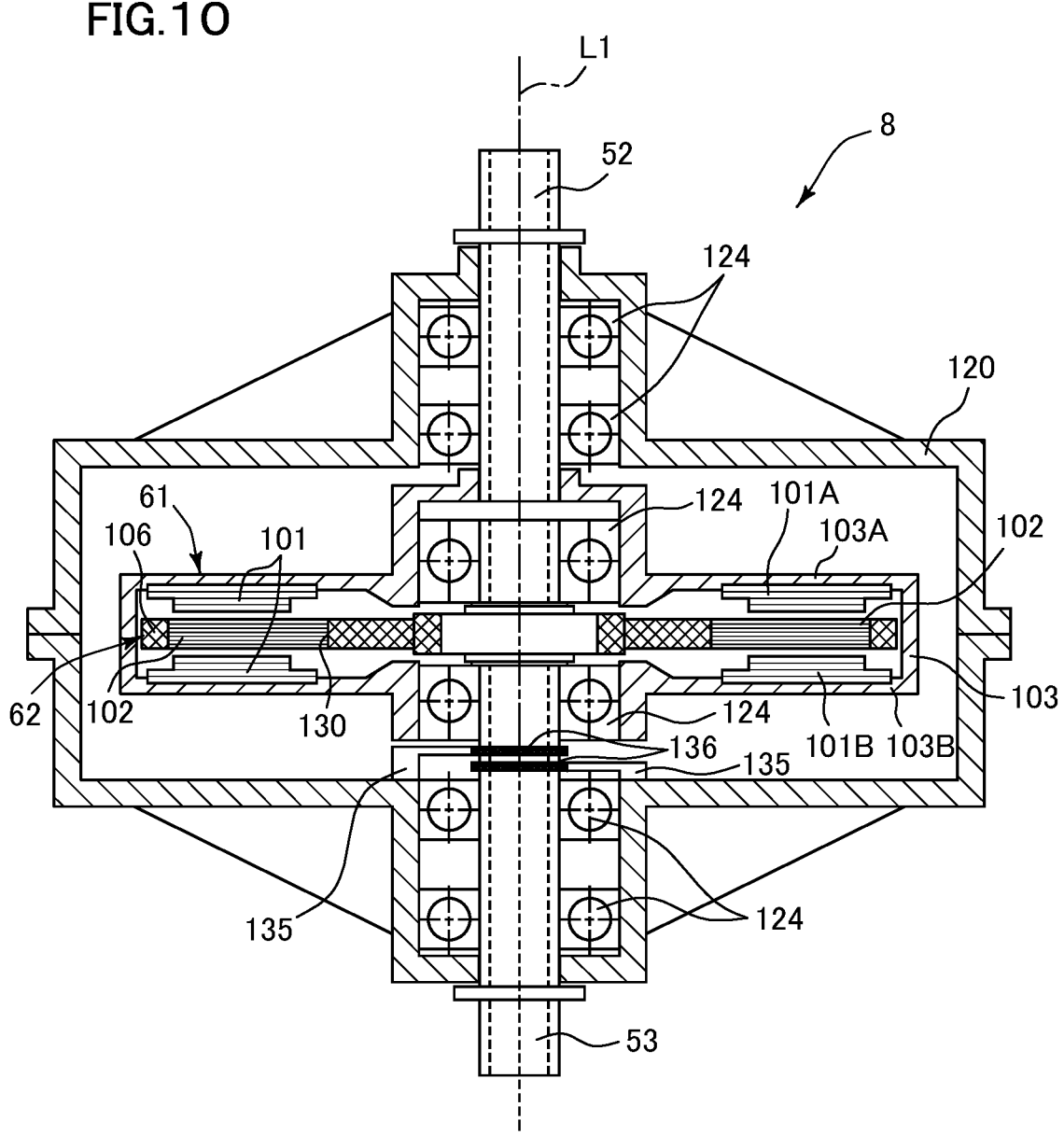
FIG. 10 is a sectional view of a power generator along a plane including the rotation axis on the plane.

The power generator 8 is located between the first and second wind turbines 2 and 5, and includes a first rotor 61 and a second rotor 62 inside a case 120, as shown in FIG. 10. The case 120 is fixed to the columns 10 of the support frame 9 by the connection members 12 (see FIG. 2).

Figure 11:
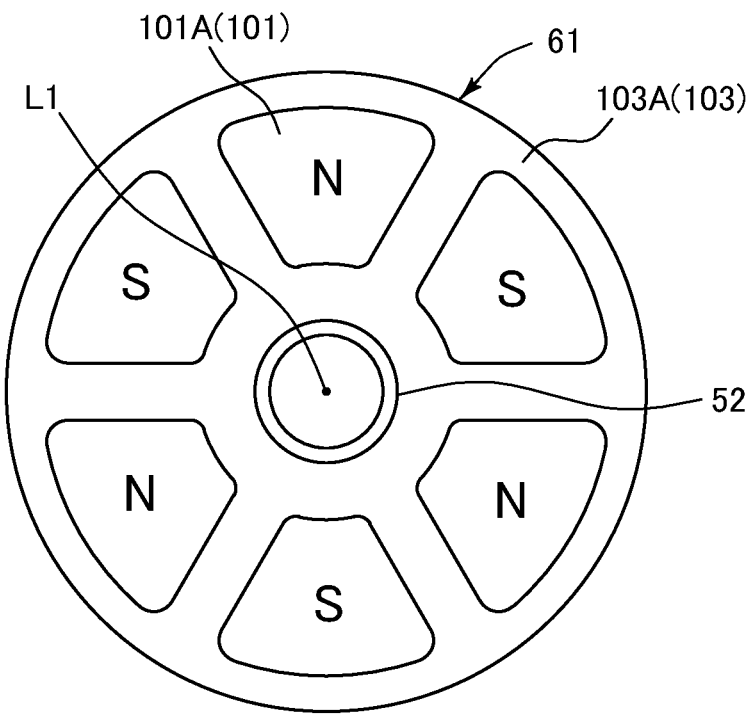
FIG. 11 is a plan view showing arrangement of field magnets in a first rotor of the power generator.

As shown in FIG. 11, in the first rotor 61, a plurality of field magnets 101 in a magnetized state are arranged at equal intervals around the rotation axis L1. Specifically, the first rotor 61 is formed such that the field magnets 101 are provided inside a flat-shaped first rotor body 103 having a hollow structure, and the above-described first wind turbine 2 is connected to the second rotary shaft 52 extending upward from the center of the first rotor body 103, so as to be integrally rotatable. The field magnets 101 are flat-shaped permanent magnets magnetized in the thickness direction (up-down direction) and are arranged such that the polarities of the adjacent magnets are inverted from each other.

As shown in FIG. 10, the first rotor body 103 is composed of an upper rotor component 103A and a lower rotor component 103B, and the same number of field magnets 101 are provided to each rotor component 103A, 103B. Field magnets 101B attached to the lower rotor component 103B are arranged at positions corresponding to field magnets 101A attached to the upper rotor component 103A, and the field magnets 101A and the field magnets 101B are magnetized in direction opposite to each other. That is, if a downward-facing surface of the field magnet 101A is N (S), an upward-facing surface of the field magnet 101B is S (N). The second rotary shaft 52 is attached to the upper rotor component 103A so as to be integrally rotatable.

Figure 12:
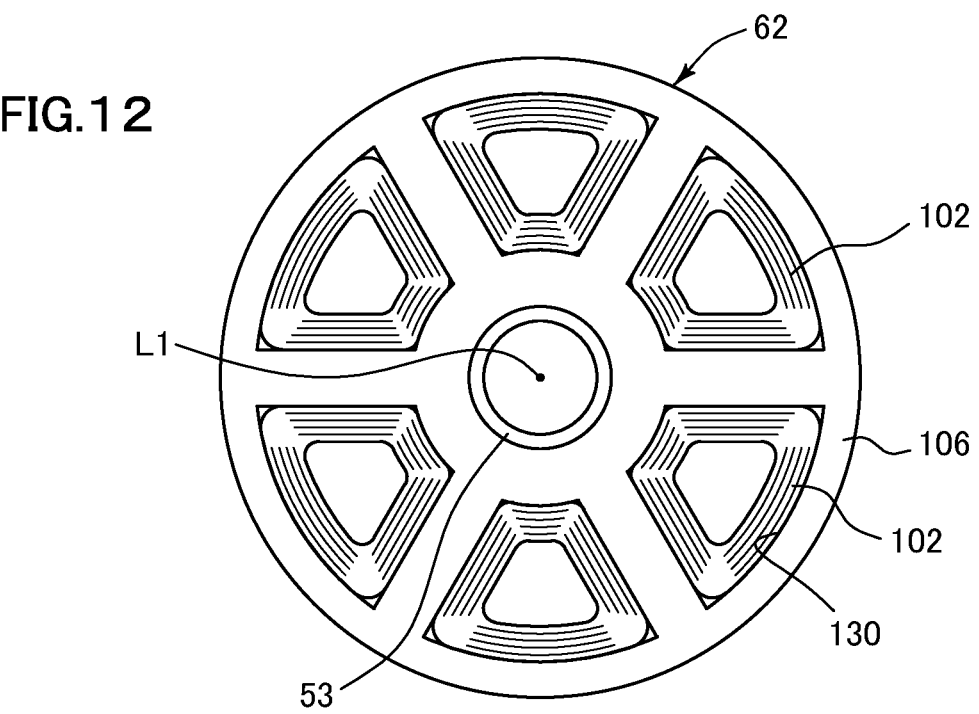
FIG. 12 is a plan view showing arrangement of power-generation coils in a second rotor of the power generator.

As shown in FIG. 12, the second rotor 62 has a plurality of power-generation coils 102 to be excited by the field magnets 101. The power-generation coils 102 are arranged such that the center axes thereof are parallel to the rotation axis L1, and the power-generation coils 102 whose number is the same as the number of the field magnets 101 are arranged at equal intervals around the rotation axis L1. The field magnets 101 and the power-generation coils 102 are arranged so as to be opposed to each other via a gap in the direction of the rotation axis L1.

Specifically, the second rotor 62 has the power-generation coils 102 fixed to coil-fixation holes 130 formed in a disk-shaped second rotor body 106. The second rotor body 106 is provided in the first rotor body 103, and the third rotary shaft 53 extending downward from the center of the second rotor body 106 penetrates the lower rotor component 103B of the first rotor body 103. The above-described second wind turbine 5 is connected to the third rotary shaft 53 so as to be integrally rotatable. Slip rings 136 respectively connected to the plurality of power-generation coils 102 are fitted to the third rotary shaft 53, and a power-generation output is extracted via brushes 135 sliding on the slip rings 136. The power-generation coils 102 are attached to the coil-fixation holes 130 such that the winding directions of the adjacent coils are opposite to each other. The second rotary shaft 52 and the third rotary shaft 53 are supported rotatably around the axis L1 by bearings 124 provided in the case 120. The bearings 124 and the case 120 storing and supporting these serve as the shaft-support portions for the rotary shafts 52, 53. The shaft-support portions for the first rotary shaft 51 and the fourth rotary shaft 54 are also formed by bearings and cases storing these.

Figure 13:
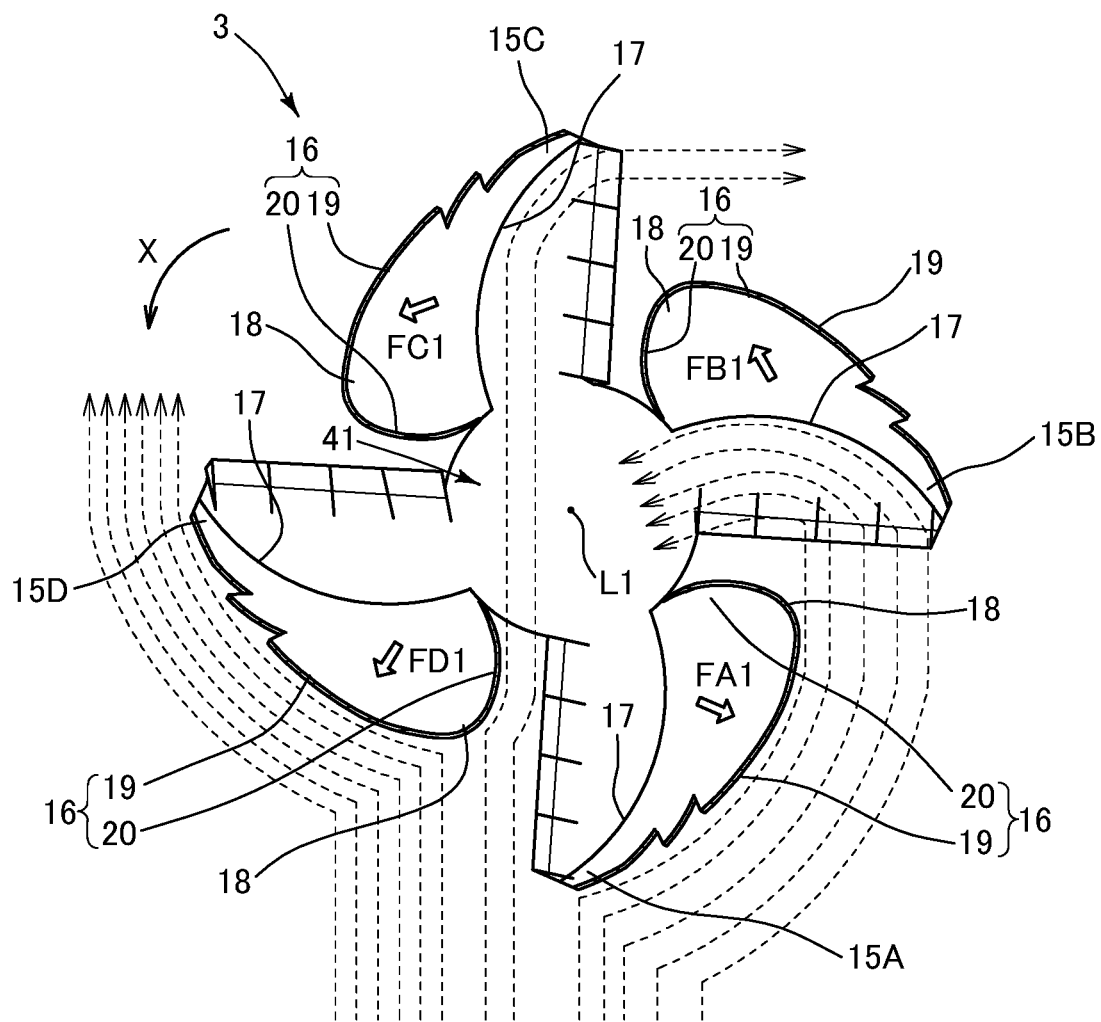
FIG. 13 is a plan view of the upper-stage portion of the first wind turbine and shows, by broken lines, flows of wind received by the rotary blades.

Next, effects of the wind power generation device 1 will be described. FIG. 13 shows, by broken lines, flows of wind when the wind is received in a direction to flow toward the wind tunnel 41 through the gap between the two rotary blades 15 among the four rotary blades 15 of the upper-stage portion 3 of the first wind turbine 2. Hereinafter, the rotary blade 15 located toward the rotation direction X on the windward side in FIG. 13 is referred to as a rotary blade 15A, and the rotary blades 15 arranged in the rotation direction X from the rotary blade 15A are sequentially referred to as rotary blades 15B, 15C, 15D, thus discriminating the four rotary blades 15 as appropriate.

As shown in FIG. 13, when the upper-stage portion 3 receives wind from the rotary blade 15A side, at the rotary blade 15A, wind hits the outward-facing first curved surface 19 of the front blade surface 16, so that a force opposite to the rotation direction X is generated. Meanwhile, wind whose course is changed toward the rotary blade 15A by the second curved surface 20 of the rotary blade 15D hits the rear blade surface 17, so that a force in the rotation direction X is generated. Then, these forces are partially canceled out, so that a force FA1 in the rotation direction X acts on the rotary blade 15A.

At the rotary blade 15B, wind hits only the rear blade surface 17, so that a force FB1 containing a component in the rotation direction X acts.

At the rotary blade 15C, wind passing through the wind tunnel 41 from the gap between the rotary blade 15A and the rotary blade 15D directly hits the rear blade surface 17. Thus, a force FC1 in the rotation direction X is generated also at the rotary blade 15C.

At the rotary blade 15D, wind hits the front blade surface 16, so that a force opposite to the rotation direction X is generated. Meanwhile, in the same manner as described in FIG. 5, at the rotary blade 15D, lift due to a flow-speed difference between relative air flows on the first curved surface 19 and the second curved surface 20 is generated in a direction to rotate the rotary blade 15D in the rotation direction X. Then, since the lift is generated in the rotation direction X, the lift cancels out, at least partially, a force due to headwind acting on the front blade surface 16.

Here, each rotary blade 15 is designed so that lift torque when the air flow is received in the normal direction at the crest 18 overcomes opposite torque due to headwind. Therefore, also at the rotary blade 15D, a force FD1 containing a component in the rotation direction X acts, though being small.

As described above, in the state shown in FIG. 13, all the forces FA1 to FD1 acting on the rotary blades 15 contribute to torque generation in the rotation direction X. As a result, the upper-stage portion 3 of the first wind turbine 2 rotates in the rotation direction X as shown in change from FIG. 13 to FIG. 14.

Figure 14:
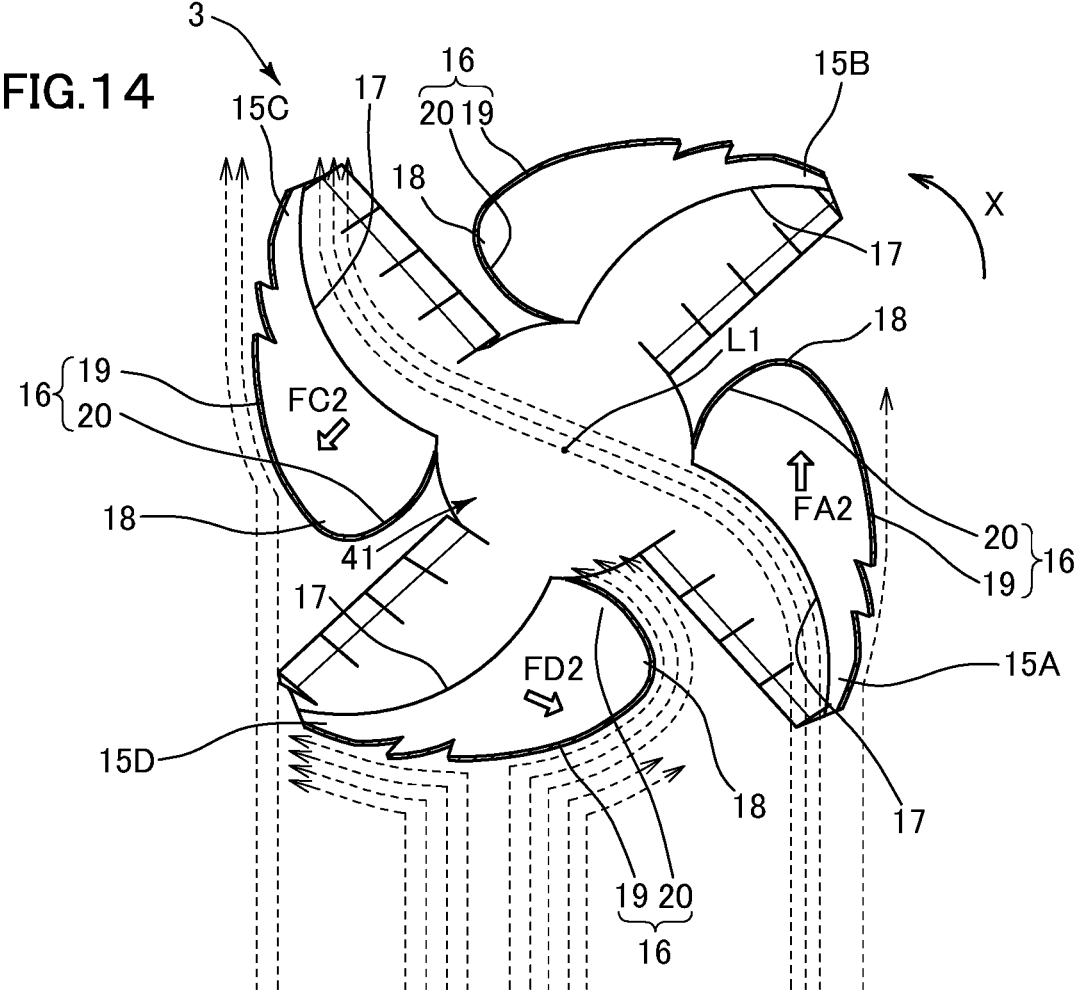
FIG. 14 is a plan view of the upper-stage portion of the first wind turbine rotated from the state in FIG. 13 and shows, by broken lines, flows of wind received by the rotary blades.

As the upper-stage portion 3 rotates from the state shown in FIG. 13, the direction of wind against each rotary blade 15 changes, and the force acting on each rotary blade 15 also changes. Specifically, as shown in FIG. 14, at the rotary blade 15A, most wind hits the rear blade surface 17, so that a force FA2 containing a component in the rotation direction X acts.

Wind hardly hits the rotary blade 15B because the rotary blade 15D blocks the wind. Thus, a force hardly acts on the rotary blade 15B.

At the rotary blade 15C, wind directly hits a part of the first curved surface 19 of the front blade surface 16, so that a force opposite to the rotation direction X acts. Meanwhile, wind that has passed through the wind tunnel 41 after hitting the rear blade surface 17 of the rotary blade 15A hits the rear blade surface 17 of the rotary blade 15C, so that a force in the rotation direction X acts. These forces are partially canceled out, so that a force FC2 containing a component in the rotation direction X acts on the rotary blade 15C.

At the rotary blade 15D, wind hits the front blade surface 16, thus serving as headwind against the rotation direction X. Thus, a force hampering rotation in the rotation direction X acts on the front blade surface 16. Meanwhile, the wind hitting the front blade surface 16 of the rotary blade 15D splits toward the rotary blade 15A side and the rotary blade 15C side, and wind flowing toward the rotary blade 15A side is guided to the wind tunnel 41 by the rear blade surface 17 of the rotary blade 15A. That is, the wind flowing toward the rotary blade 15A side goes around the crest 18, to hit the second curved surface 20. Then, in the same manner as described in FIG. 5, at the rotary blade 15D, lift is generated in the rotation direction X due to a flow-speed difference between the wind hitting the first curved surface 19 and then flowing toward the rotary blade 15A side and the wind hitting the first curved surface 19 and then flowing toward the rotary blade 15C side. Thus, a force FD2 acts on the rotary blade 15A in the rotation direction X.

As described above, also in the state shown in FIG. 14, forces FA2 to FD2 in the rotation direction X are generated on the rotary blades 15A to 15D. Meanwhile, the lower-stage portion 4 of the first wind turbine 2 has the same configuration as the upper-stage portion 3 except that the angle of the lower-stage portion 4 is shifted from the angle of the upper-stage portion 3 in the rotation direction. Therefore, forces in the rotation direction X act on the rotary blades 45 in the same manner as shown in FIGS. 13 and 14. Thus, the first wind turbine 2 starts to rotate in the rotation direction X from whichever lateral direction wind hits thereon, and continues rotating while the wind is hitting thereon.

In addition, the second wind turbine 5 has the same configuration as the first wind turbine 2 except that the second wind turbine 5 has a shape obtained by reversing the first wind turbine 2 as a mirror image in the up-down direction and is longer than the first wind turbine 2 in the direction of the rotation axis L1. Therefore, the second wind turbine 5 starts to rotate in a direction opposite to the rotation direction X of the first wind turbine 2 from whichever lateral direction wind hits thereon, and continues rotating while the wind is hitting thereon.

When the first and second wind turbines 2 and 5 rotate, the first and second rotors 61 and 62 rotate integrally with the wind turbines 2 and 5. Thus, current is generated in the power-generation coils 102 and power generation is performed.

Here, the first and second wind turbines 2 and 5 rotate at almost the same speed in directions opposite to each other. Therefore, the relative rotation speed between the field magnets 101 provided to the first rotor 61 and the power-generation coils 102 provided to the second rotor 62 is two times the rotation speed in a case where either the field magnets 101 or the power-generation coils 102 are stopped. Thus, the AC power generation voltage of the power-generation coils 102 can be two times the voltage in a case where either the field magnets 101 or the power-generation coils 102 are stopped.

In addition, since the first and second wind turbines 2 and 5 rotate at almost the same speed in directions opposite to each other, rotation torques acting on the frame 9 (columns 10, etc.) are canceled out, whereby stable rotation can be obtained.

(Effects of Recesses)

Figure 15:
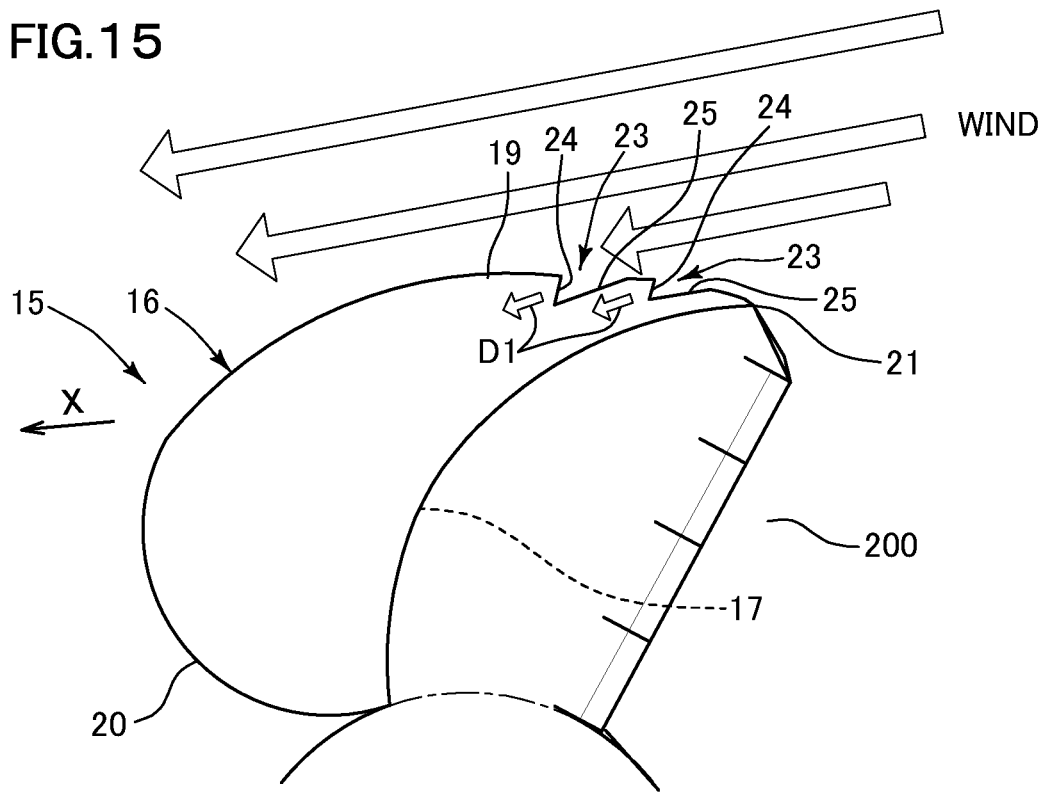
FIG. 15 is a plan view showing a state in which wind from the rear in the rotation direction acts on a front blade surface (first curved surface) of the rotary blade.

Further, since the recesses are formed on the first curved surface of the front blade surface of each rotary blade, the effects below can be obtained. FIG. 15 schematically shows a state in which wind (WIND) from the rear in the rotation direction X (i.e., tailwind) acts on the rotary blade 15 of the upper-stage portion 3 of the first wind turbine 2. As shown in FIG. 15, a part of the wind (WIND) from the rear hits the recesses 23 formed on the first curved surface 19. Thus, drags D1 for advancing the rotary blade 15 in the rotation direction X can be generated. Since the drags D1 are generated on the first curved surface 19 in addition to the rear blade surface 17, the rotational force of the rotary blade 15 can be increased, and therefore, the rotary blade 15 can be efficiently rotated.

In particular, the recesses 23 are formed on not the second curved surface 20 but the first curved surface 19 facing outward in the rotation radial direction, whereby wind flowing on the outer side in the rotation radial direction can be effectively used for rotational-force generation, that is, the wind flowing on the outer side can be effectively received. The recesses 23 serving as drag-generation portions are formed at positions close to the outer end 21 farthest from the rotation axis L1 in the rotary blade 15. Therefore, rotation torque about the position of the rotation axis L1 can be increased. The first inner surface 24 of each recess 23 faces rearward in the rotation direction X, and the slope angle $\theta 3$ (see FIG. 6) of the second inner surface 25 with respect to the main surface 26 or the virtual curved plane 260 is smaller than the slope angle $\theta 1$ (see FIG. 6) of the first inner surface 24 with respect to the main surface 26 or the virtual curved plane 260. Therefore, the wind from the rear can be guided from the second inner surface 25 to the first inner surface 24 and can be effectively received by the first inner surface 24. Thus, the drag D1 in the frontward direction X can be effectively generated.

The slope angle $\theta 1$ (see FIG. 6) of the first inner surface 24 is, for example, not smaller than 60 degrees and not greater than 150 degrees, and preferably not smaller than 90 degrees and not greater than 150 degrees. Therefore, even when the direction of the recess 23 is changed through rotation in the direction X, the wind from the rear is readily received by the first inner surface 24 at a right angle or an angle close to a right angle with respect to the surface 24. For example, in FIG. 15, even when the rotary blade 15 is rotated counterclockwise by 30 degrees with the wind direction remaining the same, the wind can be received by the first inner surface 24 of the recess 23 at an angle close to a right angle. Thus, the duration of the drag D1 can be prolonged.

In the rotation direction X, drag is generated at not only the position of the rear blade surface 17 but also a position (recess 23) different from the rear blade surface 17, whereby variation in the drag generated on the rotary blade 15 with respect to a position around the rotation axis L1 (i.e., rotation angle) can be prevented.

Figure 16:
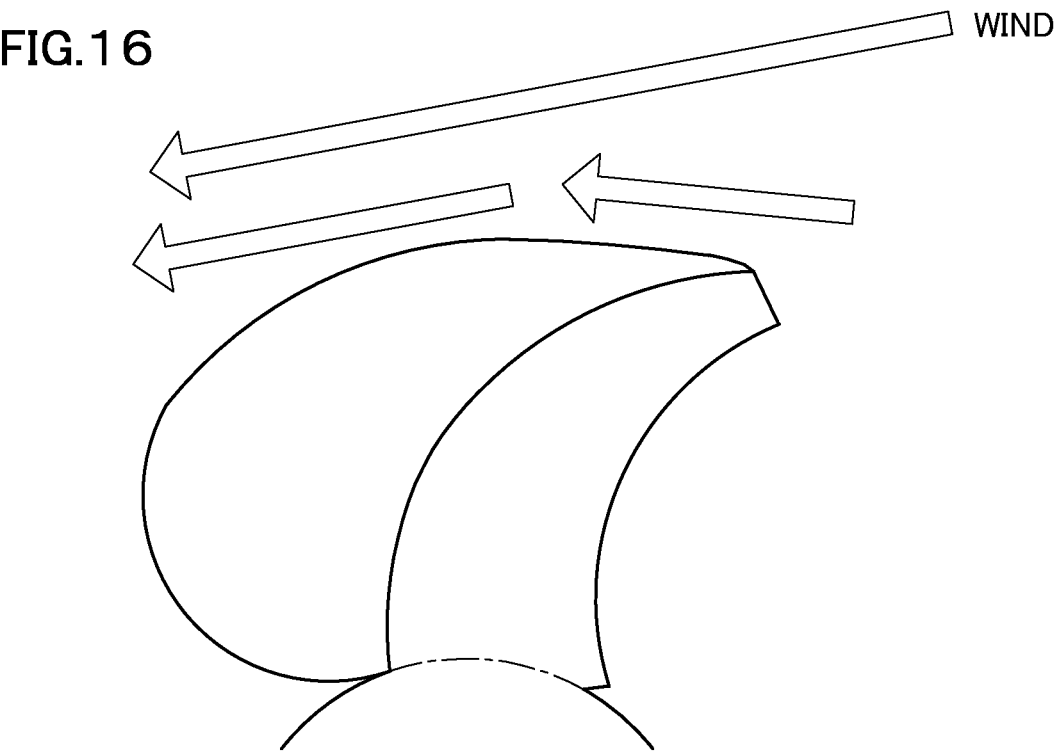
FIG. 16 is a plan view of a rotary blade in Comparative example not having recesses on the first curved surface and shows a state in which wind from the rear in the rotation direction acts on the front blade surface (first curved surface).

In contrast, in the rotary blades disclosed in Patent Documents 1 to 3, recesses are not formed on the front blade surface. Therefore, as shown in FIG. 16, tailwind flowing along the front blade surface cannot be effectively used for rotational-force generation on the rotary blade.

Figure 17:
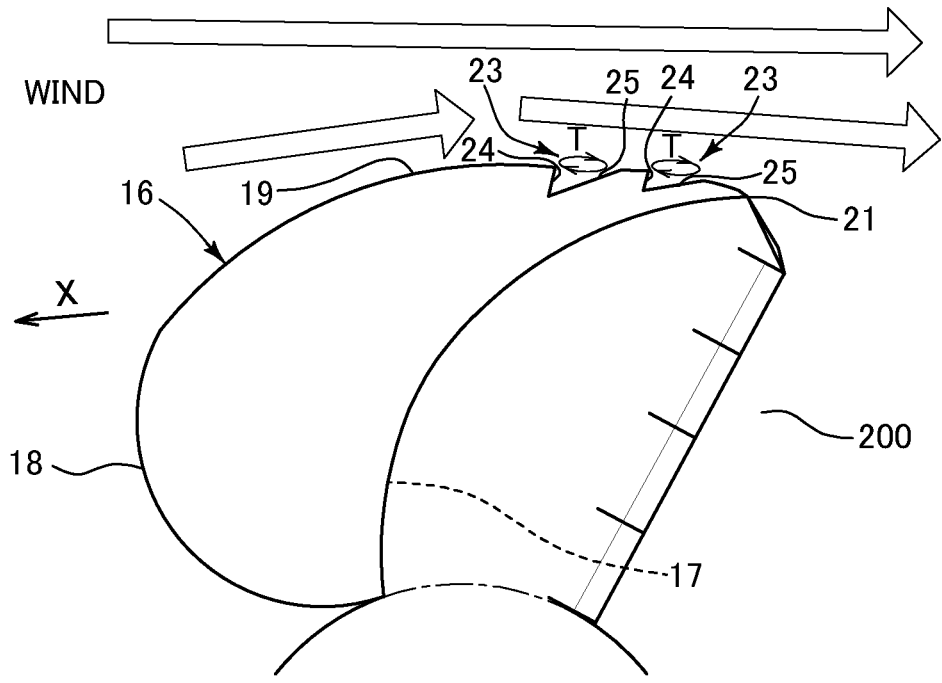
FIG. 17 is a plan view showing a state in which wind from the front in the rotation direction acts on the front blade surface (first curved surface) of the rotary blade.

FIG. 17 schematically shows a state in which wind (WIND) from the front in the rotation direction X (i.e., headwind) acts on the rotary blade 15. As shown in FIG. 17, the recesses 23 serve as vortex generators, and air vortexes T (i.e., air stagnation) are generated at the recesses 23. Owing to the local vortexes T, wind (WIND) flowing along the first curved surface 19 from the front can be prevented from going around to an area 200 opposed to the rear blade surface 17. Thus, air resistance on the following rotary blade 15 can be reduced, whereby the rotary blades 15 can be efficiently rotated.

The vortex generators 23 are formed as recesses instead of projections. Therefore, the vortex generators 23 can be prevented from generating air resistance that hampers movement in the rotation direction X.

The vortex generators 23 (recesses) are formed at positions closer to the outer end 21 than to the crest 18. Therefore, the air flow can be effectively prevented from going around the outer end 21 to the area 200 opposed to the rear blade surface.

The first inner surface 24 of each recess 23 faces rearward in the rotation direction X, and the slope angle θ3 (see FIG. 6) of the second inner surface 25 with respect to the main surface 26 or the virtual curved plane 260 is smaller than the slope angle θ1 (see FIG. 6) of the first inner surface 24 with respect to the main surface 26 or the virtual curved plane 260. Therefore, rearward drag generated when wind from the front hits the recess 23 can be reduced.

Figure 18:
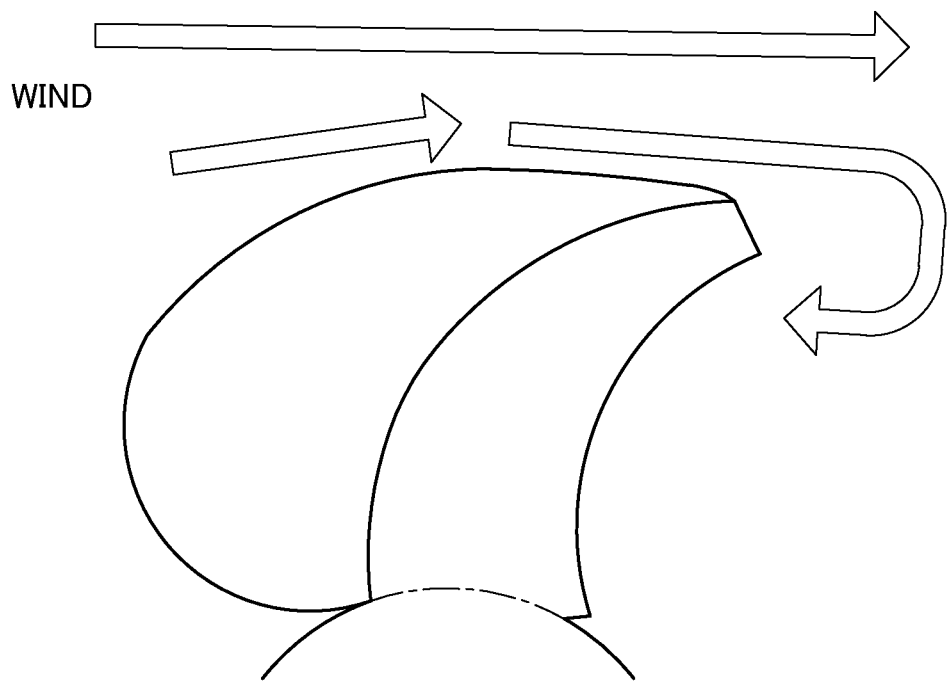
FIG. 18 is a plan view of the rotary blade in Comparative example not having recesses on the first curved surface and shows a state in which wind from the front in the rotation direction goes around to the rear blade surface side after flowing along the front blade surface (first curved surface).

In contrast, in the rotary blades disclosed in Patent Documents 1 to 3, recesses are not formed on the front blade surface. Therefore, as shown in FIG. 18, a part of wind from the front goes around to an area opposed to the rear blade surface after flowing along the front blade surface, thus generating air resistance on the following rotary blade.

The rotary blades 45 of the lower-stage portion 4 of the first wind turbine 2 and the rotary blades of the second wind turbine 5 also have the same shape as the rotary blades 15 of the upper-stage portion 3, and therefore can obtain the same effects as those of the rotary blades 15 shown in FIGS. 15 and 17.

(Effects of Slope Portions)

Since the blade-support portions supporting the upper and lower ends of each rotary blade have the slope portions, effects below can be obtained. FIG. 19 schematically shows a state in which wind (WIND) from the rear in the rotation direction X (i.e., tailwind) acts on the rotary blade 15 of the upper-stage portion 3 of the first wind turbine 2. As shown in FIG. 19, the wind from the rear can be received by also the upper and lower slope portions 34 in addition to the rear blade surface 17, whereby a wind-reception area S of the rotary blade 15 can be increased. That is, in addition to the rear blade surface 17, also at the slope portions 34 (blade-support portions), drags D2 in the frontward direction X can be generated. Thus, the rotary blade 15 can be efficiently rotated.

From each of the upper and lower ends of the rotary blade 15, the slope portion 34 rises in the oblique direction having a direction component toward a side opposite to the side where the rotary blade 15 (rear blade surface 17) is located in the direction parallel to the rotation axis L1, and a direction component rearward in the rotation direction X. Therefore, air V (see FIG. 19) present in an area frontward in the rotation direction X from the slope portion 34 can be guided in the oblique direction, whereby the slope portion 34 can be prevented from generating air resistance that hampers movement in the frontward direction X.

The slope portion 34 can improve rigidity of the plate-shaped blade-support portion 30. In particular, the rear end 33b of the arm body 33 and the slope portion 34 formed along the rear end 33b have straight shapes, and therefore rigidity of the blade-support portion 30 can be further improved. Thus, the blade-support portions 30 and the rotary blades 15 (front blade surfaces 16, rear blade surface 17, and lid plates 28) supported by the blade-support portions 30 can be prevented from vibrating or being displaced in a direction other than the rotation direction X, whereby the rotary blades 15 can be efficiently rotated in the direction X. In addition, since the rear end 33b and the slope portion 34 have straight shapes, the blade-support portion 30 can be manufactured more easily than in a case where these have curved shapes.

Since the slope portions 34 are provided rearward in the rotation direction X relative to the rear blade surface 17, the slope portions 34 can serve as guide vanes for guiding wind from the rear to the rear blade surface 17. Thus, wind from the rear can be concentrated on the rear blade surface 17, whereby drag in the forward direction X generated on the rear blade surface 17 can be increased.

FIG. 20 schematically shows a state in which the wind (WIND) (i.e., headwind) from the front in the rotation direction X acts on the rotary blade 15. Since each slope portion 34 is formed in the oblique direction, as shown in FIG. 20, the slope portion 34 can guide headwind from the front toward the oblique direction, and the slope portion 34 can be prevented from generating air resistance that hampers movement in the frontward direction X. In addition, wind W guided toward the oblique direction can contribute to rotational-force generation on the rotary blade of another rotation portion adjacent to the upper-stage portion 3 in the up-down direction (specifically, the rotary blade 45 of the lower-stage portion 4).

The rotary blades 45 of the lower-stage portion 4 of the first wind turbine 2 and the rotary blades of the second wind turbine 5 also have the same shape as the rotary blades 15 of the upper-stage portion 3, and therefore can obtain the same effects as those of the rotary blades 15 shown in FIGS. 19 and 20.

(Effects of Erected Portions)

As shown in FIGS. 7, 19, and 20, the blade-support portion 30 of the upper-stage portion 3 has the plurality of erected portions 36 erected from both of the arm body 33 and the slope portion 34, whereby rigidity of the blade-support portion 30 can be further improved.

Each erected portion 36 can serve as a vortex generator. That is, since the space frontward of the slope portion 34 is divided into the plurality of spaces 37 by the plurality of erected portions 36 (see FIG. 7), a local vortex is generated in each space 37, and owing to the vortex, the wind W from the front (see FIG. 20) can be prevented from going around to the area 200 opposed to the rear blade surface 17. In particular, each erected portion 36 may be connected at an angle other than a right angle with respect to one or both of the arm body 33 and the slope portion 34, or may be formed in non-parallel to the adjacent erected portion 36, whereby the erected portion 36 can effectively serve as a vortex generator, that is, a local vortex can be effectively generated at the erected portion 36 (space 37). Thus, air resistance on the following rotary blade 15 can be reduced, whereby the rotary blade 15 can be efficiently rotated.

The rotary blades 45 of the lower-stage portion 4 of the first wind turbine 2 and the rotary blades of the second wind turbine 5 also have the same shape as the rotary blades 15 of the upper-stage portion 3, and therefore can obtain the same effects as those of the erected portions 36 of the rotary blades 15.

(Effects Owing to Circumferential-Direction Angle Difference Between Upper-Stage Portion and Lower-Stage Portion)

The first wind turbine 2 is divided into the upper-stage portion 3 and the lower-stage portion 4, and these upper-stage and lower-stage portions 3 and 4 have an angle difference by 45 degrees in the circumferential direction about the rotation axis L1. Thus, variation in drag (rotation torque) with respect to the rotation angle can be reduced as described below.

Figure 21:
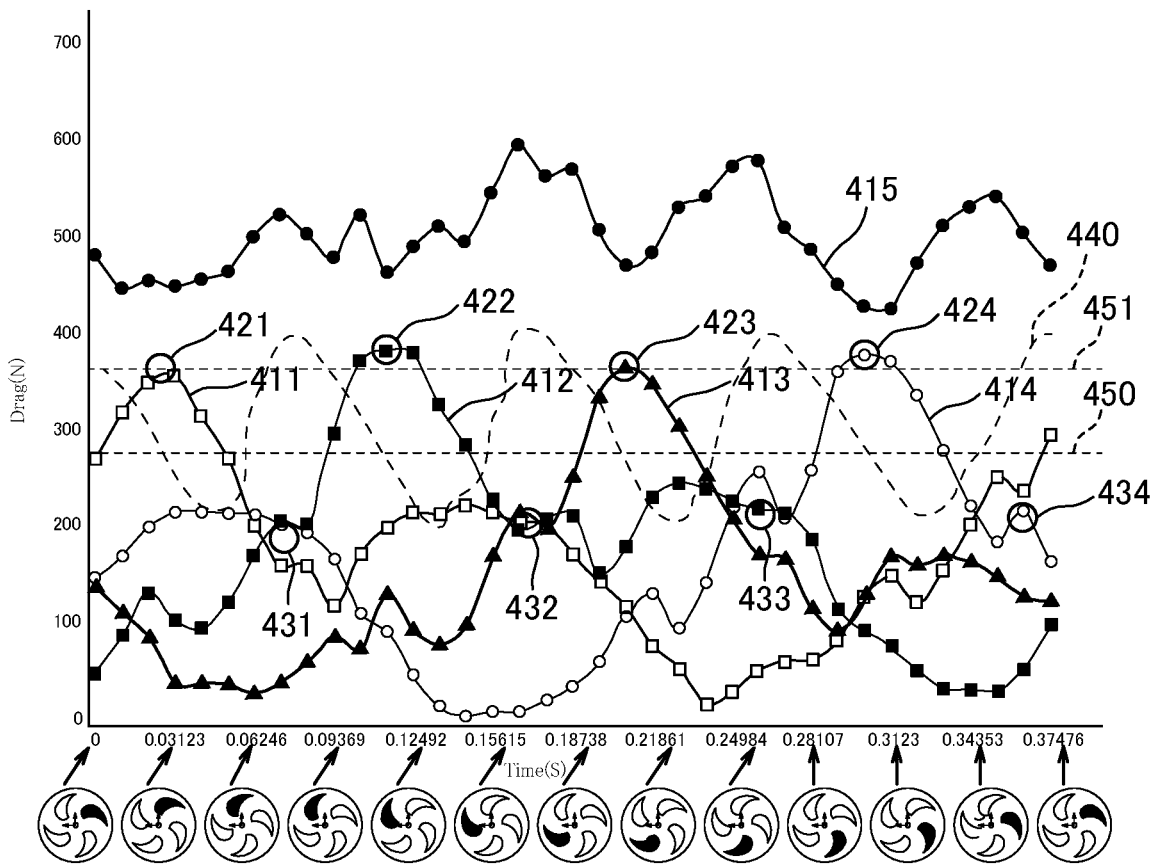
FIG. 21 shows experimental data indicating variations of drags acting on the rotary blades and a rotary shaft with respect to the rotational position.
Figure 22:
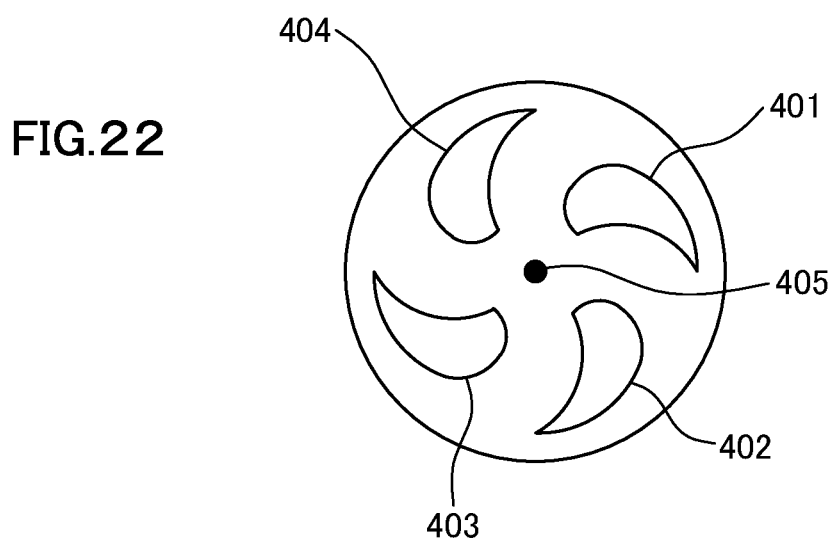
FIG. 22 is a plan view in which four rotary blades are arranged around the rotation axis.

FIG. 21 shows, by lines 411 to 415, variations with respect to the rotational position in drags acting on rotary blades and a rotary shaft when wind is supplied in a constant direction perpendicular to the rotation axis to a conventional wind turbine disclosed in Patent Documents 1 to 3. The wind turbine used in an experiment in FIG. 21 includes four rotary blades 401 to 404 having the same shape as the rotary blades disclosed in Patent Documents 1 to 3, as shown in FIG. 22. The horizontal axis in FIG. 21 indicates the position, around a rotary shaft 405, of each rotary blade 401 to 404 in FIG. 22, and specifically, indicates the elapsed time while the first rotary blade 401 makes one revolution. On the horizontal axis, time representing the position of the first rotary blade 401 per 30-degree rotation is indicated. In FIG. 21, the lines 411 to 414 show variations in drags on the respective rotary blades 401 to 404. The line 415 shows variation in drag acting on the rotary shaft 405 (see FIG. 22).

As shown by the lines 411 to 414 in FIG. 21, for each rotary blade 401 to 404, there is a rotation angle at which wind is readily received by the rear blade surface (a rotation angle at each of maximum points 421 to 424 (maximum drags) of the respective lines 411 to 414) (a rotation angle at which the wind becomes tailwind in the advancing direction of each rotary blade 401 to 404), and meanwhile, there is a rotation angle at which wind is hardly received by the rear blade surface (a rotation angle at which the wind becomes headwind against the advancing direction of each rotary blade 401 to 404). Thus, the drags vary greatly. In addition, the maximum drags 421 to 424 on the respective rotary blades 401 to 404 are alternately generated at intervals of the arrangement-interval angle (90 degrees) of the rotary blades 401 to 404. In addition, the drags respectively drop at an intermediate point 431 between the first maximum point 421 and the second maximum point 422, an intermediate point 432 between the second maximum point 422 and the third maximum point 423, an intermediate point 433 between the third maximum point 423 and the fourth maximum point 424, and an intermediate point 434 between the fourth maximum point 424 and the first maximum point 421. In addition, since variations in the drags 411 to 414 generated on the rotary blades 401 to 404 are great, variation in the drag 415 on the rotary shaft 405 is also great.

In contrast, in this embodiment, the first wind turbine 2 includes the upper-stage portion 3 and the lower-stage portion 4 which are provided with an angle difference by 45 degrees in the circumferential direction. Therefore, if maximum-drag-generation rotation angles in the upper-stage portion 3 are at the maximum points 421 to 424 in FIG. 21, maximum-drag-generation rotation angles in the lower-stage portion 4 can appear at the intermediate points 431 to 434 in FIG. 21, as shown by a broken line 440. The broken line 440 corresponds to drag variation with respect to the rotation angle in the lower-stage portion 4. Thus, drag dropping at the intermediate points 431 to 434 can be prevented and drag variation with respect to the rotation angle can be prevented. Since drag variation can be prevented, the average value (average drag) of drag varying with respect to the rotation angle can be increased. That is, in FIG. 21, a line 451 (the average value of the lines 411 to 414 and the broken line 440) indicating the average drag in the two-stage structure is greater than a line 450 (the average value of the lines 411 to 414) indicating the average drag in the one-stage structure.

The fact that drag variation can be prevented means that reduction in the rotation speed of the rotary blade when the rotary blade receives headwind relative to the rotation speed of the rotary blade when the rotary blade receives tailwind, can be prevented. Since reduction in the rotation speed when the rotary blade receives headwind can be prevented, lift against headwind can be effectively generated on the front blade surface, that is, lift generated by the first curved surface and the second curved surface of the front blade surface can be increased.

The upper-stage portion 3 and the lower-stage portion 4 are provided at different positions in the direction of the rotation axis L1. Therefore, as compared to a structure in which eight rotary blades are arranged at equal intervals at the same position in the direction of the rotation axis L1, the space between the rotary blades in the direction around the rotation axis L1 can be enlarged. This allows wind to readily flow between the rotary blades.

Thus, rotation efficiency of the first wind turbine 2 can be improved. In addition, the second wind turbine 5 has the same configuration as the first wind turbine 2 except that the rotation direction of the second wind turbine 5 is opposite to that of the first wind turbine 2, and therefore can obtain the same effects as those of the first wind turbine 2.

As Comparative example, this discloser prepared a one-stage rotary body in which four rotary blades having shapes similar to conventional rotary blades shown in Patent Documents 1 to 3 are arranged at equal intervals in the circumferential direction, and measured changes in the power-generation amount and the rotation rate with respect to the wind speed in the one-stage rotary body. In addition, as Example, this discloser prepared two rotary bodies that are the same as the rotary body used in measurement in Comparative example, and connected the two rotary bodies in the up-down direction such that the rotation directions thereof are the same and the two rotary bodies have an arrangement-angle difference from each other by 45 degrees in the circumferential direction, thus forming a two-stage-structure rotary body. Then, the same measurement as in Comparative example was performed for the two-stage-structure rotary body. The diameters of the rotary bodies used in Comparative example and Example were 500 mm. In the measurements in Comparative example and Example, rotary blades not having the recesses, the slope portions, and the erected portions described above were used.

It was confirmed that, in Example having the two-stage structure, the power-generation amount and the rotation rate were improved as compared to Comparative example having the one-stage structure. Specifically, in Comparative example, the maximum power-generation amount was about 13 W, whereas in Example, the maximum power-generation amount was about 40 W. If the maximum power-generation amount 13 W in the Comparative example is converted to a value in a case where power generation is performed with rotary bodies at two stages, the value becomes 13 W x 2=26 W. The maximum power-generation amount 40 W in Example was about 1.5 times greater than the power-generation amount 26 W in the case of simply providing two stages. This is an effect by providing an angle difference by 45 degrees in the circumferential direction between the rotary bodies at two stages. That is, it is considered that, by providing the angle difference, as described above, reduction in the rotation speed when the rotary blade receives headwind can be prevented, and lift against headwind is effectively generated on the front blade surface, thus obtaining the above effect.

Table 1 below shows, for each wind speed, the rotation rate of the rotary body having a diameter of 500 mm when the wind speed and the circumferential speed of the rotary body were the same.

TABLE 1

| Rotary body diameter | Wind speed 3 m/s | Wind speed 4 m/s | Wind speed 5 m/s | Wind speed 6 m/s | Wind speed 7 m/s | Wind speed 8 m/s |
|---|---|---|---|---|---|---|
| Φ 500 | 115 | 153 | 191 | 229 | 267 | 306 |

| Wind speed 9 m/s | Wind speed 10 m/s | Wind speed 12 m/s | Wind speed 14 m/s | Wind speed 16 m/s | Wind speed 20 m/s |
|---|---|---|---|---|---|
| 344 | 382 | 458 | 535 | 611 | 764 |

In Example, the rotation rate when the wind speed was 14 m/s was about 700 RPM. The rotation rate 700 RPM is greater than a rotation rate 535 RPM when the wind speed was 14 m/s in Table 1. This means that the two-stage rotary body used in Example rotated at a speed greater than the wind speed. The ratio of the circumferential speed of this rotary body to the wind speed (circumferential-speed ratio) was actually calculated to be about 1.3. Meanwhile, the circumferential-speed ratio in Comparative example was about 1.

It is technical common knowledge that a drag-type wind turbine such as a Savonius wind turbine cannot obtain a circumferential speed greater than the wind speed (i.e., the circumferential-speed ratio cannot exceed 1). However, in the wind turbine of this embodiment, while the rotational force is basically obtained using drag, lift is effectively generated in addition to drag, whereby the circumferential speed greater than the wind speed can be obtained (i.e., a circumferential-speed ratio greater than 1 can be obtained).

This disclosure is not limited to the above embodiment and may be modified variously. For example, in the above embodiment, the number of the rotary blades included in each stage portion (upper-stage portion, lower-stage portion) of each wind turbine is four, but may be three or may be five or more.

In the above embodiment, the first and second wind turbines that rotate in directions opposite to each other are stacked at two upper and lower stages. However, a configuration having only one wind turbine may be employed.

In the above embodiment, the support frame includes three columns. However, the support frame may include four or more columns.

In the above embodiment, the rear blade surface of the rotary blade forms a part of a cylindrical plane including the rotation axis of the rotary blade on the plane, but may not form a part of the cylindrical plane. That is, as seen in a plan view perpendicular to the rotation axis, the extended line obtained by extending the arc of the shape of the rear blade surface toward the rotation axis side may not intersect the rotation axis.

In the above embodiment, an axial-gap power generator in which field magnets and power-generation coils of the power generator are arranged so as to be opposed to each other via a gap in the rotation-axis direction, has been shown. However, a radial-gap power generator in which field magnets and power-generation coils are arranged so as to be opposed to each other via a gap in the radial direction perpendicular to the rotation axis, may be applied.

The above embodiment has shown the example in which the first and second wind turbines are each divided into two stages. However, each wind turbine may be divided into three or more stages. Also in this case, between a plurality of stage portions, the rotation directions are set to be the same and the rotary-blade arrangement angles in the circumferential direction are shifted. For example, where Y is the arrangement-interval angle in the circumferential direction of the rotary blades in each stage portion and N is the number of the stage portions, the rotary-blade arrangement positions in the rotation direction are shifted by an angle of Y/N between the plurality of stage portions. For example, it is assumed that the wind turbine is divided into three stages of an upper-stage portion, a middle-stage portion, and a lower-stage portion, the number of the rotary blades in each stage portion is four, and the arrangement-interval angle Y is 90 degrees. In this case, the rotary-blade arrangement positions in the rotation direction are shifted by 90/3=30 degrees between the upper-stage portion and the middle-stage portion, and also, the rotary-blade arrangement positions in the rotation direction are shifted by 30 degrees between the middle-stage portion and the lower-stage portion. Also in this configuration, drag variation with respect to the rotation angle can be prevented.

The above embodiment has shown the example in which the rotary-blade arrangement positions are shifted by an angle (=Y/2) that is half of the above arrangement-interval angle Y, between the upper-stage portion and the lower-stage portion of each wind turbine. However, the upper-stage portion and the lower-stage portion may be provided with an angle difference other than Y/2. Also in this case, drag variation with respect to the rotation angle can be prevented.

The above embodiment has shown the example in which the upper-stage portion and the lower-stage portion of each wind turbine are connected with a gap therebetween in the axial direction via the spacer. However, the upper-stage portion and the lower-stage portion may be directly connected not via the spacer. In this case, the lower blade-support portion of the upper-stage portion and the upper blade-support portion of the lower-stage portion may be formed in shapes not having the slope portions and the erected portions (i.e., the same shape as the shape of the blade-support portion shown in Patent Documents 1 to 3), and these two blade-support portions may be directly connected.

The above embodiment has shown the example in which the upper and lower blade-support portions of each stage portion (upper-stage portion, lower-stage portion) of each wind turbine both have the slope portions and the erected portions. However, only one of the upper and lower blade-support portions may have the slope portions and the erected portions.

The above embodiment has shown the example in which the first curved surface of the front blade surface has two recesses. However, the number of the recesses may be one or may be three or more.

The above embodiment has shown the example in which the lid plate closing the hollow part formed between the front blade surface and the rear blade surface, and the blade-support portion supporting the rotary blade, are separate members. However, the lid plate and the blade-support portion may be formed as one member.

The above embodiment has shown the example in which the rotation axis of the rotating device is directed in the vertical direction. However, the rotation axis may be directed in a direction (e.g., horizontal direction) other than the vertical direction, as long as the rotation axis is perpendicular to the flow direction of a fluid.

The above embodiment has shown the example in which the recess formed on the first curved surface has two surfaces that are the first inner surface facing rearward in the rotation direction and the second inner surface extending rearward from the end in the recessed direction of the first inner surface and connecting to the main surface of the first curved surface or the outer end of the front blade surface. However, the recess may have any shape such as a shape formed by three surfaces that are a first side surface facing rearward in the rotation direction, a second side surface facing frontward in the rotation direction, and a bottom surface connecting an end of the first side surface and an end of the second side surface, a concave-curved surface shape, or a V shape. Irrespective of the shape of the recess, for headwind, the recess serves as a vortex generator and thus can prevent the wind from going around to the rear blade surface side, and for tailwind, the recess serves as a portion that generates drag frontward in the rotation direction. In this regard, the recess having the two-surface structure shown in the above embodiment can effectively serve as the vortex generator for headwind and as the drag-generation portion for tailwind.

The above embodiment has shown the example in which, as seen in a plan view perpendicular to the rotation axis, the rear end of the arm body of the blade-support portion is located rearward in the rotation direction relative to the rear blade surface. However, the rear end may be located at a position overlapping the rear blade surface and have an arc shape with a curvature similar to the curvature of the rear blade surface. Also in this case, the slope portion formed from the rear end of the arm body can serve as a guide vane for guiding an air flow to the rear blade surface. A part of the rear end of the arm body may be located rearward in the rotation direction relative to the rear blade surface as seen in a plan view, and another part of the rear end may be located at a position overlapping the rear blade surface or frontward in the rotation direction relative to the rear blade surface as seen in a plan view.

The rotary blade or the rotating device of this disclosure may be applied to a water turbine, that is, this disclosure may be applied to the structure of a rotary blade or a rotating device that receives water flow (water power). The rotary blade, the rotating device, or the power generation device of this disclosure may be mounted to a vehicle. In this case, the rotation axis of the rotary blades is directed in the left-right direction of the vehicle. In this case, the wedge-shaped recesses of this disclosure formed on the first curved surface of the rotary blade may be distributed over the entire first curved surface as seen in a plan view. That is, the recess may be also formed at a position close to the boundary portion (the crest of the front blade surface) between the first curved surface and the second curved surface, in addition to the position close to the outer end of the rotary blade. Thus, drag that is generated on the first curved surface and rotates the rotary blade in the rotation direction can be increased.

The above embodiment has shown the example in which the rotating device satisfies all of the following conditions: (1) the recesses are formed on the first curved surfaces of the front blade surfaces, (2) the slope portions are formed on the blade-support portions, and (3) the rotating device is formed by a plurality of stage portions, and these stage portions rotate in the same direction and have an angle difference in the rotary-blade arrangement positions in the rotation direction. However, the rotary blade or the rotating device that satisfies only one or two of the above (1), (2), and (3) is also feasible. Also in this case, rotation efficiency of the rotary blade can be improved as compared to the conventional configuration. In the case of satisfying the above (2), the erected portions erected from surfaces of both of the arm body and the slope portion may or may not be provided.

The rotary blade of this disclosure may be configured as follows.

That is, the rotary blade of this disclosure is provided rotatably about a rotation axis and configured to receive a fluid, and includes: a front blade surface parallel to the rotation axis and curved so as to protrude frontward in a rotation direction; a rear blade surface located on a back side of the front blade surface, the rear blade surface being parallel to the rotation axis and curved so as to be concave frontward in the rotation direction, the rear blade surface having a smaller curve depth than the front blade surface; and a blade-support portion supporting ends, in a direction parallel to the rotation axis, of the front blade surface and the rear blade surface. In a plan view perpendicular to the rotation axis, an end of the front blade surface on a side far from the rotation axis is defined as an outer end, and an end thereof on a side close to the rotation axis is defined as an inner end. The front blade surface includes a first curved surface forming a part far from the rotation axis and formed frontward in the rotation direction from the outer end, and a second curved surface forming a part close to the rotation axis and formed rearward in the rotation direction from a side opposite to the outer end of the first curved surface, so as to connect to the inner end, a surface length of the second curved surface in the plan view being smaller than that of the first curved surface. The blade-support portion includes a body portion supporting the front blade surface and the rear blade surface, and having a rear end which extends in a rotation radial direction and is located at a position overlapping the rear blade surface or a position rearward in the rotation direction relative to the rear blade surface, as seen in the plan view, and a slope portion formed along the rear end and extending from the rear end toward an oblique direction having a direction component toward a side opposite to a side where the rear blade surface is located in the direction parallel to the rotation axis and a direction component rearward in the rotation direction.

The rotating device of this disclosure may be configured as follows.

That is, the rotating device of this disclosure includes a plurality of stage portions in each of which a plurality of rotary blades are arranged at equal intervals around the rotation axis, the stage portions being arranged in a direction of the rotation axis. Each of the rotary blades is provided rotatably about the rotation axis and configured to receive a fluid, and includes a front blade surface parallel to the rotation axis and curved so as to protrude frontward in a rotation direction, and a rear blade surface located on a back side of the front blade surface, the rear blade surface being parallel to the rotation axis and curved so as to be concave frontward in the rotation direction, the rear blade surface having a smaller curve depth than the front blade surface. In a plan view perpendicular to the rotation axis, an end of the front blade surface on a side far from the rotation axis is defined as an outer end, and an end thereof on a side close to the rotation axis is defined as an inner end. The front blade surface includes a first curved surface forming a part far from the rotation axis and formed frontward in the rotation direction from the outer end, and a second curved surface forming a part close to the rotation axis and formed rearward in the rotation direction from a side opposite to the outer end of the first curved surface, so as to connect to the inner end, a surface length of the second curved surface in the plan view being smaller than that of the first curved surface. The stage portions include the rotary blades whose numbers and rotation directions are the same among the plurality of stage portions. The plurality of stage portions have an angle difference from each other in arrangement positions of the rotary blades in a direction around the rotation axis. The plurality of stage portions are connected so as to rotate while keeping the angle difference.

DESCRIPTION OF THE REFERENCE CHARACTERS 1 wind power generation device (power generation device)
2 first wind turbine (first rotating device)
3 upper-stage portion of first wind turbine
4 lower-stage portion of first wind turbine
5 second wind turbine (second rotating device)
6 upper-stage portion of second wind turbine
7 lower-stage portion of second wind turbine
8 power generator (power generation portion)
15, 45 rotary blade
16 front blade surface
17 rear blade surface
19 first curved surface
20 second curved surface
21 outer end of rotary blade
22 inner end of rotary blade
23 recess
30, 30A, 30B blade-support portion
31 central portion of blade-support portion
32 arm portion of blade-support portion
33 arm body
33b rear end of arm body
34 slope portion of arm portion
36 erected portion of arm portion

The invention claimed is:

1. A rotary blade provided rotatably about a rotation axis and configured to receive a fluid, the rotary blade comprising:
a front blade surface parallel to the rotation axis and curved so as to protrude frontward in a rotation direction; and
a rear blade surface located on a back side of the front blade surface, the rear blade surface being parallel to the rotation axis and curved so as to be concave frontward in the rotation direction, the rear blade surface having a smaller curve depth than the front blade surface, wherein
in a plan view perpendicular to the rotation axis, an end of the front blade surface on a side far from the rotation axis is defined as an outer end, and an end thereof on a side close to the rotation axis is defined as an inner end,
the front blade surface includes
a first curved surface forming a part far from the rotation axis and formed frontward in the rotation direction from the outer end, and
a second curved surface forming a part close to the rotation axis and formed rearward in the rotation direction from a side opposite to the outer end of the first curved surface, so as to connect to the inner end, a surface length of the second curved surface in the plan view being smaller than that of the first curved surface,
a recess is formed on the first curved surface,
a part of the first curved surface where the recess is not formed is defined as a main surface,
the recess includes a first inner surface forming a stepped portion facing rearward in the rotation direction, and a second inner surface formed rearward in the rotation direction from an end in a recessed direction of the first inner surface and connecting to the outer end or the main surface,
a plane obtained by extending a plane having the same curvature as a curvature of the main surface at a boundary portion between the main surface and the first inner surface toward the recess side from the boundary portion is defined as a virtual curved plane,
as seen in a cross-section perpendicular to the rotation axis, a slope angle of the first inner surface is defined as
an angle between an extended line obtained by extending a tangent of the main surface at the boundary portion between the main surface and the first inner surface outward from the boundary portion, and a tangent of the first inner surface at the boundary portion, or
an angle between a tangent of the virtual curved plane at a boundary portion between the virtual curved plane and the first inner surface, and a tangent of the first inner surface at the boundary portion,
as seen in the cross-section perpendicular to the rotation axis, a slope angle of the second inner surface is defined as
an angle between an extended line obtained by extending a tangent of the second inner surface at a boundary portion between the second inner surface and the main surface outward from the boundary portion, and a tangent of the main surface of the boundary portion, or an angle between a tangent of the virtual curved plane at a boundary portion between the virtual curved plane and the second inner surface, and a tangent of the second inner surface at the boundary portion, and the slope angle of the second inner surface is smaller than the slope angle of the first inner surface, wherein as seen in a cross-section perpendicular to the rotation axis, an angle between the first inner surface and the second inner surface is an acute angle.

2. The rotary blade according to claim 1, wherein the slope angle of the first inner surface is not smaller than 90 degrees and not greater than 150 degrees.

3. The rotary blade according to claim 1, wherein the recess is formed at a position closer to the outer end than to a boundary portion between the first curved surface and the second curved surface.

4. The rotary blade according to claim 1, further comprising a blade-support portion supporting ends, in a direction parallel to the rotation axis, of the front blade surface and the rear blade surface, wherein the blade-support portion includes
- a body portion supporting the front blade surface and the rear blade surface, and having a rear end which extends in a rotation radial direction and is located at a position overlapping the rear blade surface or a position rearward in the rotation direction relative to the rear blade surface, as seen in the plan view, and
- a slope portion formed along the rear end and extending from the rear end toward an oblique direction having a direction component toward a side opposite to a side where the rear blade surface is located in the direction parallel to the rotation axis and a direction component rearward in the rotation direction.

5. The rotary blade according to claim 4, wherein the body portion includes
- a central portion located at a position of the rotation axis, and
- an arm portion extending in the rotation radial direction from an outer periphery of the central portion, the arm portion supporting the front blade surface and the rear blade surface and having the rear end.

6. The rotary blade according to claim 5, wherein the blade-support portion includes a plurality of erected portions arranged with an interval therebetween along the rear end and erected from surfaces of both of the arm portion and the slope portion.

7. A rotating device comprising a plurality of stage portions in each of which a plurality of the rotary blades according to claim 1 are arranged at equal intervals around the rotation axis, the stage portions being arranged in a direction of the rotation axis, wherein
- each of the plurality of stage portions include a same number of the rotary blades,
- rotation directions of the rotary blades are the same among the plurality of stage portions,
- the plurality of stage portions have an angle difference from each other in arrangement positions of the rotary blades in a direction around the rotation axis, and
- the plurality of stage portions are connected so as to rotate while keeping the angle difference.

8. The rotating device according to claim 7, wherein
- a number of the stage portions connected so as to rotate in the same direction while keeping the angle difference is two, and
- the angle difference is half of an angle representing an arrangement interval, in the direction around the rotation axis, of the plurality of rotary blades included in one of the stage portions.

9. A power generation device comprising:
- a first rotating device which is the rotating device according to claim 7;
- a second rotating device which is the rotating device according to claim 7, and which is provided so as to have the rotation axis shared with the first rotating device and rotate in a direction opposite to a rotation direction of the first rotating device; and
- a power generation portion including a field magnet which rotates along with rotation of the first rotating device, and a power-generation coil which rotates along with rotation of the second rotating device.

* * * * *